(12) United States Patent
Petculescu et al.

(10) Patent No.: US 7,680,776 B2
(45) Date of Patent: Mar. 16, 2010

(54) SYSTEMS AND METHODS FOR PROACTIVE CACHING UTILIZING OLAP VARIANTS

(75) Inventors: Cristian Petculescu, Redmond, WA (US); Amir Netz, Bellevue, WA (US); Thomas P. Conlon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 87 days.

(21) Appl. No.: 11/329,616

(22) Filed: Jan. 11, 2006

(65) Prior Publication Data
US 2006/0129597 A1    Jun. 15, 2006

Related U.S. Application Data

(62) Division of application No. 10/402,000, filed on Mar. 28, 2003, now Pat. No. 7,269,581.

(51) Int. Cl.
  *G06F 7/00* (2006.01)
  *G06F 17/30* (2006.01)
  *G06F 17/00* (2006.01)
(52) U.S. Cl. .......................... 707/3; 707/100
(58) Field of Classification Search ........... None
  See application file for complete search history.

(56) References Cited

U.S. PATENT DOCUMENTS

| | | | |
|---|---|---|---|
| 5,878,223 A | 3/1999 | Becker et al. | |
| 5,924,096 A | 7/1999 | Draper et al. | |
| 5,926,818 A | 7/1999 | Malloy | |
| 5,978,796 A | 11/1999 | Malloy et al. | |
| 6,205,447 B1 | 3/2001 | Malloy | |
| 6,216,212 B1 | 4/2001 | Challenger et al. | |
| 6,272,502 B1 * | 8/2001 | Lieuwen et al. | 707/203 |
| 6,493,718 B1 | 12/2002 | Petculescu et al. | |
| 6,763,357 B1 | 7/2004 | Deshpande et al. | |
| 7,058,640 B2 | 6/2006 | Le | |
| 2002/0029207 A1 * | 3/2002 | Bakalash et al. | 707/1 |
| 2002/0129032 A1 | 9/2002 | Bakalash et al. | |
| 2003/0120593 A1 | 6/2003 | Bansal et al. | |
| 2003/0200194 A1 * | 10/2003 | Arnold et al. | 707/1 |
| 2004/0133543 A1 | 7/2004 | Shlaes et al. | |

OTHER PUBLICATIONS

Albrecht, et al. "Building a real data warehouse for market research", Database and Expert Systems Applications, Sep. 1-2, 1997, 651-656.*

Roy et al. "Query Result Caching in Data Warehouses and Data Marts", Apr. 16, 1999.*

(Continued)

*Primary Examiner*—Charles Rone
*Assistant Examiner*—Charles D Adams
(74) *Attorney, Agent, or Firm*—Workman Nydegger

(57) ABSTRACT

The present invention leverages MOLAP performance for ROLAP objects (dimensions, partitions and aggregations) by building, in a background process, a MOLAP equivalent of that object. When the background processing completes, queries are switched from ROLAP queries to MOLAP queries. When changes occur to relevant relational objects (such as tables that define content of OLAP objects), an OLAP object is switched back to a ROLAP mode, and all relevant caches are dropped while, as a background process, a new MOLAP equivalent is created.

12 Claims, 20 Drawing Sheets

OTHER PUBLICATIONS

Roy, et al., "Query Result Caching in Data Warehouses and Data Marts" IIT Bombay Apr. 16, 1999, pp. 1-13.
EP Search Report dated Mar. 23, 2006; mailed Mar. 27, 2006; EP Patent Application Serial No. 04 00 6401; 2 pages.
Loukopoulos, et al.; Active Caching of On-Line Analytical-Processing Queries in WWW Proxies; 2001; 8 pages.
Shin'Ichirou, et al.; Parallel Generation of Base Relation Snapshots for Materialized View Maintenance in Data Warehouse Environment; 2002; 8 pages.
Kalnis, et al.; An Adaptive Peer-to-Peer Network for Distributed Caching of OLAP Results; 2002; 12 pages.
Deshpande, et al.; Caching Multidimensional Queries Using Chunks; 1998; 12 pages.
Albrecht et al. Building a Real Data Warehouse for Market Research IEEE 1997 p. 651-656.
Panos Kalnis and Dimitris Papadias. Proxy-Server Architectures for OLAP Proceedings of the 2001 ACM SIGMOD Conference, pp. 367-378.
Yihong Zhao, Kristin Tufte, and Jeffrey R. Naughton. On the Performance of an Array-Based ADT for OLAP Workloads, Technical Report CS-TR-96-1313, Univeristy of Wisconsin-Madison, CS Department, May 1996. 20 pages.
Volker Markl, Frank Ramsak, and Rudolf Bayer. Improving OLAP Performance by Multidimensional Hierarchical Clustering. IEEE Proceedings of IDEAS'99. 13 pages.
OA Dated Dec. 29, 2008 for U.S. Appl. No. 11/329,446, 17 pages.
OA Dated Nov. 14, 2008 for U.S. Appl. No. 11/379,900, 28 pages.
Shasha. The Emergence of the Data Warehouse. Department of Computer Science, New York University, Aug. 2000, 13 pages.

* cited by examiner

SYSTEMS AND METHODS FOR PROACTIVE CACHING UTILIZING OLAP VARIANTS

RELATED APPLICATIONS

This application is a divisional of U.S. patent application Ser. No. 10/402,000, filed Mar. 28, 2003, now U.S. Pat. No. 7,269,581 entitled "SYSTEMS AND METHODS FOR PROACTIVE CACHING UTILIZING OLAP VARIANTS" which is incorporated herein by reference.

TECHNICAL FIELD

The present invention relates generally to caching data, and more particularly to systems and methods for proactively caching data utilizing OLAP variants.

BACKGROUND OF THE INVENTION

Computing and networking technologies have transformed many important aspects of everyday life. Computers have become a household staple instead of a luxury, educational tool or entertainment center, and provide users with a tool to manage and forecast finances, control household operations like heating, cooling, lighting and security, and store records and images in a permanent and reliable medium. Networking technologies like the Internet provide users with virtually unlimited access to remote systems, information and associated applications.

As computing and networking technologies become robust, secure and reliable, more consumers, wholesalers, retailers, entrepreneurs, educational institutions and the like are shifting paradigms and employing networks, such as the Internet, to perform business instead of the traditional means. For example, many businesses and consumers are providing web sites or on-line services. For example, today a consumer can access his/her account via the Internet and perform a growing number of available transactions such as balance inquiries, funds transfers and bill payment.

Typically, a network session includes a user interfacing with a client application to interact with a server that stores information in a database that is accessible to the client application. For example, a stock market web site can provide the user with tools for retrieving stock quotes and purchasing stock. The user can type in a stock symbol and request a stock quote by performing a mouse click to activate a query. The client application queries a database table of stocks and returns a stock quote.

A shortcoming of computing and networking technologies is the limited bandwidth. A user consumes a portion of the bandwidth whereby the portion consumed is not available to other users. Therefore, as more and more users employ a network, the available bandwidth decreases which can reduce response time and performance. Another shortcoming of computing and networking technologies is the limited available data transfer rates relative to the quantity of data available. For example, requests that retrieve large amounts of data (e.g., distributed across various servers) can be time intensive, which can diminish performance also.

Thus, Business Intelligence (BI) solutions were developed to aid in accessing information about large databases. Most businesses in recent times have migrated to relational type databases. Data warehouses were developed to store tactical information to answer the "who" and "what" questions about the stored data related to previous events. However, this proved limiting due to the fact that data warehouses only have the capability of retrieving historical data. Therefore, on-line analytical processing (OLAP) systems were developed to not only answer the "who" and "what", but also the "what if" and "why" of the data. OLAP systems are multidimensional views of aggregate data that allow analysts, business managers, and executives to gain insight into the information through a quick, reliable, interactive process.

Analysis tools, including OLAP tools, help to reduce the access times to extreme amounts of data. By utilizing these tools, a user can ask general questions or "queries" about the data rather than retrieve all the data verbatim. Thus, "data about data" or metadata helps expedite the query process and reduce the required network bandwidth. However, as is typical in a business environment, what was fast yesterday is considered slow by today's standard. There is always an increasing demand for faster information delivery, in spite of the exponentially expanding sizes of data stores.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to caching data, and more particularly to systems and methods for proactively caching data utilizing OLAP variants. OLAP variants are leveraged to create multiple query sources about a data source. By efficiently converting multidimensional object based on the data source to an OLAP variant cache, such as a MOLAP (Multidimensional OLAP) cache, users gain an ability to have queries quickly analyzed and also maintain a capability to access the data source real-time. The present invention also allows for interactive participation by the user as to when a variant is utilized, providing faster and more user-oriented query responses than by employing a non-proactive caching scheme.

The present invention also facilitates data analysis by decreasing the need to directly access large databases through employment of a cache based, in part, on multidimensional analysis data, extending the usefulness of existing data structures and providing quick and efficient analysis of extremely large databases. Because all OLAP variants have strengths and weaknesses, a system utilizing a single variant generally does not satisfy a user completely, returning stale data and/or responding slowly. The present invention drastically decreases the query response time and, at the same time, enables real-time information to be extracted, allowing a user to receive data quickly and seemingly transparent as to the variant utilized to respond to a query, maximizing user-friendliness, increasing the speed of information retrieval, and providing reliable information regardless of the variant employed.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
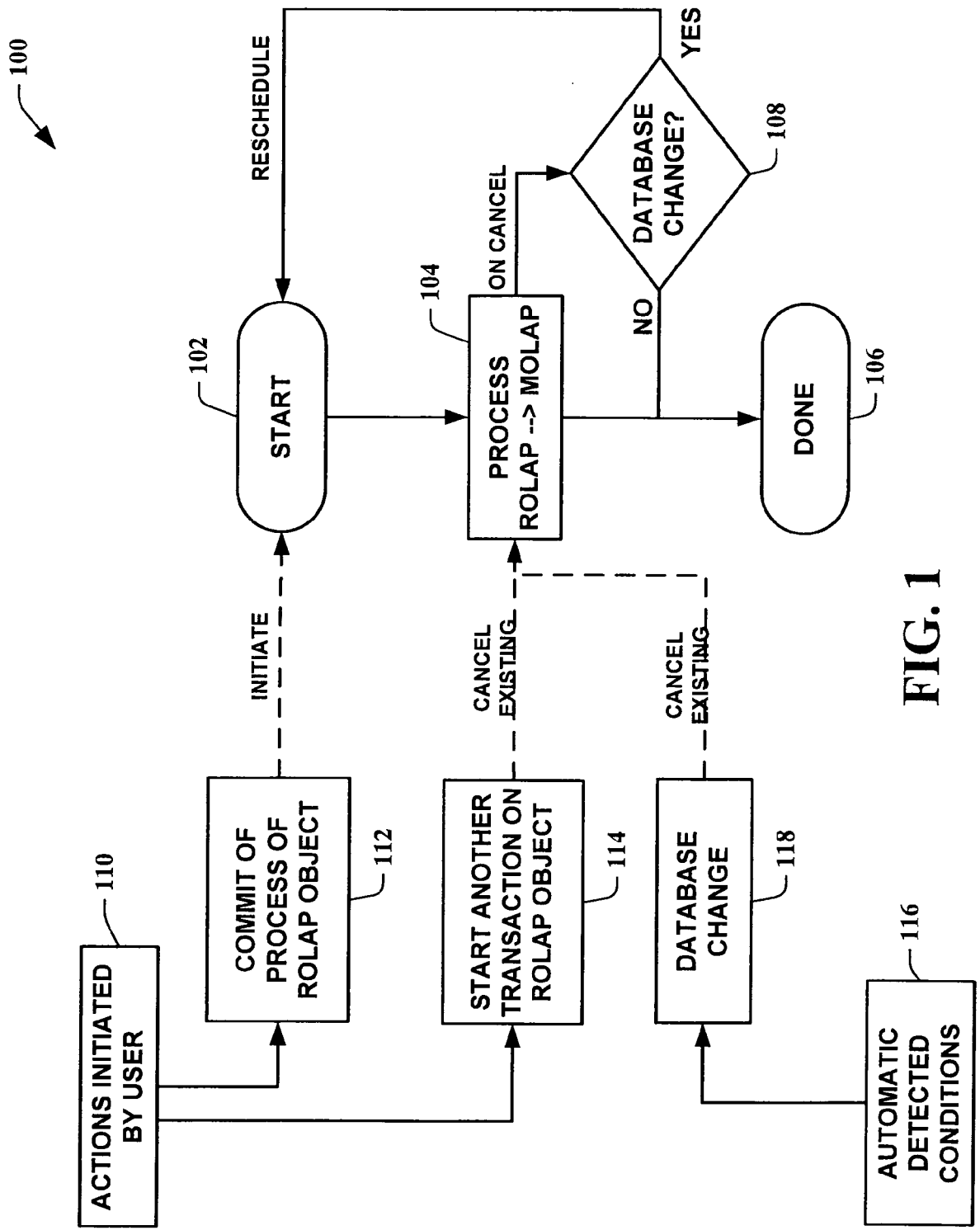
FIG. 1 illustrates an exemplary proactive caching process in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

Since no single OLAP variant can provide both low latency and real-time data, the present invention leverages MOLAP performance for ROLAP objects (dimensions, partitions and aggregations) by building, as a background process, a MOLAP equivalent of that object. When the background processing is completed, object usage is switched to MOLAP queries, enabling much faster query response times. As changes occur to relevant relational objects (such as tables that define a content of the OLAP objects), the OLAP object is switched back to a ROLAP mode, and all the relevant caches are dropped while, in the background, a new MOLAP equivalent is created. Thus, the MOLAP equivalent is employed to provide a cache which is proactively controlled depending upon the mode being utilized to process the queries. This allows a user to get the benefit of immediate browsing of data (and/or to always reflect the most up-to-date picture of a relational database) without paying the typical performance price of querying ROLAP objects. This permits the user to perceive the present invention as a shim layer of metadata around a database, such as a relational database and the like, always providing the most up-to-date data as quickly as possible. In order to achieve maximum global performance users have various options by which they can fine tune proactive caching and influence its behavior vis-à-vis of changes in a relational database (these options are detailed infra).

If a user is interested in viewing the most recent data (real-time OLAP), but doesn't want the delay inherent in browsing ROLAP data, the user can instruct a system to build, in a background transaction, an equivalent MOLAP object and to "switch" the queries to use a MOLAP "image" instead. When changes occur to underlying relational objects, the system automatically responds to them as soon as they occur and opens a short transaction that reverts an object back to a ROLAP mode. Then, the system will re-open the background transaction and rebuild the MOLAP image. Should an update happen while the background transaction is in progress, MOLAP processing is canceled and the background transaction is restarted. These background transactions are somewhat "second class citizens" in the sense that they can be canceled in case a user initiated transaction needs to lock an object in a mode incompatible with a current locking mode of an object, due to a background transaction.

In FIG. 1, an exemplary proactive caching process 100 in accordance with an aspect of the present invention is illustrated. The proactive caching process 100 starts 102 and a ROLAP object is processed into a MOLAP cache 104. The process 100 is completed 106, unless a cancel is received, invoking a check on whether a database has changed 108. If the database has no changes 108, the process 100 is completed 106. However, if the database has changes 108, the process 100 is rescheduled and starts again 102. In a typical instance of the present invention, actions are generated by a user 110. These actions 110 can include committing of processing of a ROLAP object 112 which initiates the process 100. Another action generated by the user 110 can include starting another transaction on the ROLAP object 114, canceling an existing ROLAP object to MOLAP cache process 104. A system can also automatically detect conditions 116 such as, for example, a database change 118 and the like. Once a database change 118 has occurred, an existing ROLAP object to MOLAP cache process 104 is canceled.

A user can also specify a minimum duration of "quiet time" via a "quiet time delay" feature before starting a background transaction of building a new MOLAP image. This allows multiple cross-transaction insert/updates into an OLTP (On-Line Transaction Processing) (many OLTP applications update transactional data this way, by individual inserts at a certain moment in time). This reduces the query stress that an OLAP server puts on an OLTP system by repetitive queries. The quiet time delay is accomplished by a component that keeps track of a "last updated" time of any involved tables.

Similar to the quiet time delay feature, an optional "delayed" triggering feature specifies that all changes are tracked in a background thread that treats accumulated changes every designated time period (a configurable interval). In the logical scheme, this feature is implemented by a queue implementation in between the two threads, all of the invocations being handled through this queue. This feature permits a notification mechanism that can be presented by certain providers to prevent overloading an OLTP with queries that ask whether the tables were updated or not. Generally, this is accomplished on a per server basis (not per object) because it describes a notification behavior of a whole proactive caching subsystem.

Another feature allows for "manual" changes to be made via a means for a user to mark certain tables/views/ROLAP objects as being "dirty", triggering the above process manually. This is typically done by a DDL (Data Definition Language) statement that can be sent to a server through a regular mechanism, e.g., XML/A (extensible Markup Language/Analysis) and the like. In one aspect of the present invention, there can be two categories of marking: relational object marking (potentially can affect multiple ROLAP objects) and/or ROLAP object marking (basically bootstrapping a relational layer as far as dependencies are concerned).

Yet another feature permits a means for creating a list of tracking tables. A user can label tables that affect a certain ROLAP object. The advantages of doing this include the following. One advantage of this feature is that if a certain table on which an object is based upon is not a real table but a view or a DSV (Data Set Viewer) view (named query), it would be hard to track events on whether a view changed (typical notification mechanisms—SQL (Structured Query Language) notification and triggers operate on tables and materialized views, not regular views and named queries). In the absence of this feature, the only reasonable way of tracking changes to a view is to parse its SQL definition (but, again, it might be based on other views by itself and parsing SQL is not a reasonable approach). Another advantage is related to the "manual" change feature. Often, it is desirable to mark an object as dirty even if it doesn't have bindings to a certain table but that table changed.

In one aspect of the present invention, the means has a capability for listing tables in at least one of two places: 1) Within a DSV, a list of alternate tables is provided for proactive caching tracking. Thus, for proactive caching purposes, when a ROLAP object depends on this table, it registers itself as actually depending on alternate tables. It is desirable that the alternate tables are trackable relational objects (tables and/or materialized views, not views). 2) Within a ROLAP object, a list of alternate/additional tables is provided by which to track the object. This is often needed for objects that do not have necessary bindings to relational objects within a DSV (partitions). It is desirable that these tables are trackable objects as well (tables and/or materialized views).

Still yet another feature provides a means for a "Limited latency". This feature specifies a duration between a start of a new MOLAP image creation and a cancellation of an old MOLAP image and reverting to ROLAP (if any). In one aspect of the present invention, by default, this duration is zero (basically, two transactions—one that rolls back an object to ROLAP and one that starts building a MOLAP engine—start in parallel). Advantages of this feature include having a duration in which queries go to a ROLAP store drops to a minimum and providing analysis at the end of building a MOLAP image of a ROLAP proactive cached dimension (in case an expiration interval didn't pass yet). If a change was truly incremental, a proactive cached partition is not affected. If a change affected non-granularity attributes, it can drop (revert to ROLAP and reschedule) flexible aggregations and leave everything else untouched. Otherwise, the means reverts dependent partitions/aggregations to ROLAP.

A "quiet time override" feature provides a means to specify that if this amount of time after an initial notification is reached, MOLAP imaging kicks in unconditionally. However, it should be noted that, in one aspect of the present invention, if a MOLAP imaging has been started due to an override and if another notification comes while this is in building, that notification does not cancel the MOLAP imaging that is in progress. It is recorded for normal treatment (while if a processing has been started using a "normal" path, a notification results in the canceling of a MOLAP imaging if the current storage mode is ROLAP).

A "force rebuild" feature specifies that a MOLAP imaging starts unconditionally at this time after a fresh image has been built. In one aspect of the present invention, if notifications come while this is in progress, they are queued for normal treatment.

Figure 2:
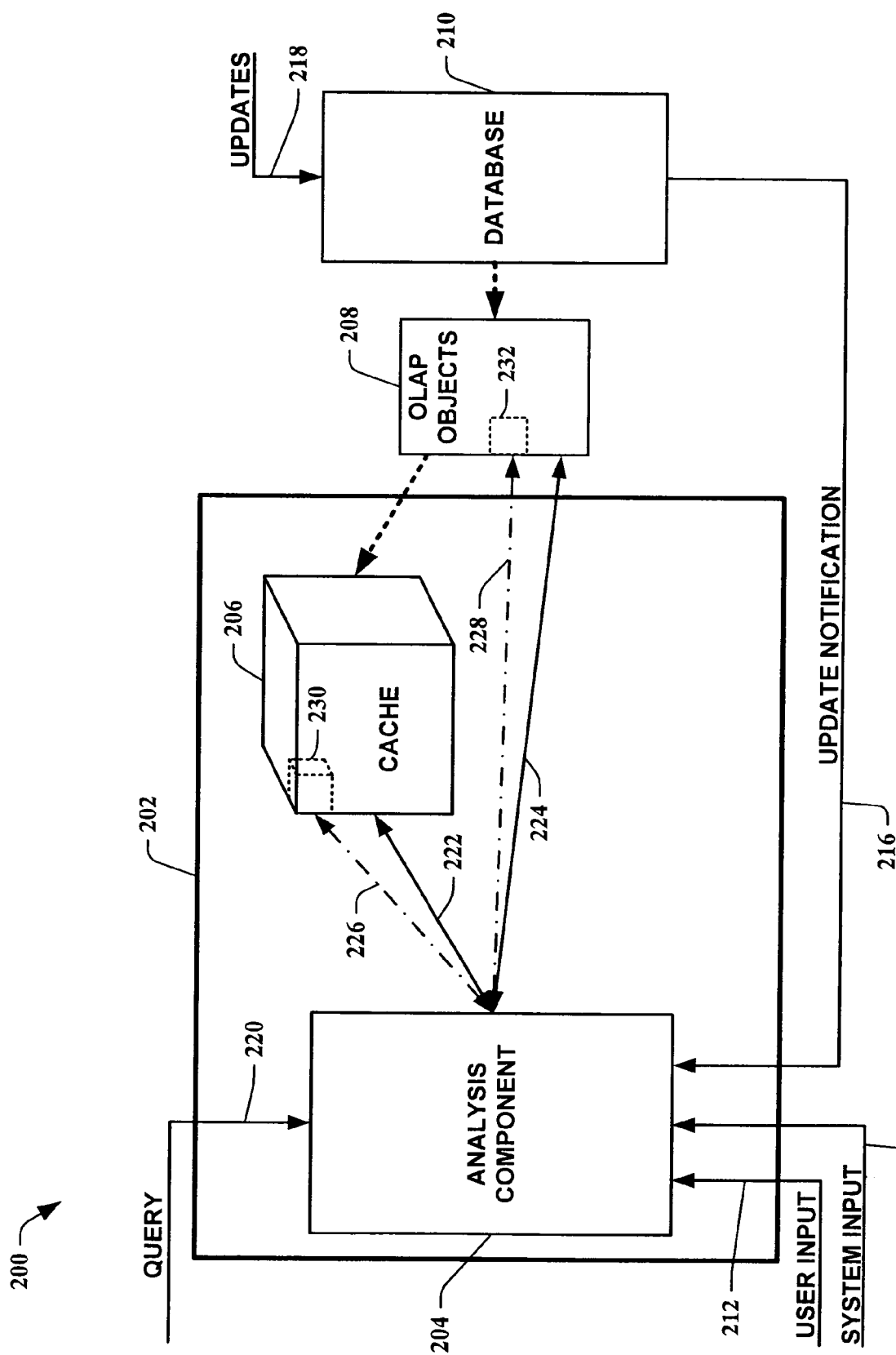
FIG. 2 is a block diagram of a database serving system in accordance with an aspect of the present invention.

Turning to FIG. 2, a block diagram of a database serving system 200 in accordance with an aspect of the present invention is shown. The database serving system 200 is comprised of a proactive caching system 202, multidimensional objects 208, such as "OLAP objects" and the like, with a multidimensional objects subset 232, and a database 210 with a capability of accepting updates 218. The proactive caching system 202 is comprised of an analysis component 204 and at least one cache 206 with a cache subset 230. This system 200 provides query analysis and response to users via the proactive caching system 202. The proactive caching system 202 leverages multidimensional objects 208 based on the database 210 to provide a system for providing low latency responses and/or real-time responses while remaining seemingly transparent to a user.

In this aspect of the present invention, the analysis component 204 has inputs comprising a query input 220, a user input 212, a system input 214, and a database input 216 for update notifications and the like. In other instances of the present invention, the database input 216 is part of the system input 214. The analysis component 204 has a cache interface 222 and a multidimensional objects interface 224. These interfaces 222, 224 provide access from the analysis component 204 to the cache 206 and/or the multidimensional objects 208, dependent upon a desired query response (i.e., proactively seeking an appropriate cache for an appropriate response). In other aspects of the present invention, the analysis component has a cache subset interface 226 to the cache subset 230 and a multidimensional objects subset interface 228 to the multidimensional objects subset 232. The subset interfaces 226, 228 provide access to subsets of the cache 206 and the multidimensional objects 208 while other parts of the cache 206 and/or the multidimensional objects 208 are being updated. The cache 206 is comprised of information derived from the multidimensional objects 208. The multidimensional objects 208 are based on the database 210.

In one instance of the present invention, a system for caching information is comprised of at least one multidimensional object 208 providing dynamic multidimensional analysis data derived from a database 210, at least one cache 206 providing dynamic multidimensional analysis data from at least one multidimensional object 208 and at least one analysis component 204 coupled to the multidimensional object 208 and the cache 206 for proactively controlling access to the multidimensional object 208 and the cache 206. In other instances of the present invention, the multidimensional object 208 is comprised of OLAP objects, such as ROLAP objects and the like. In yet another instance of the present invention, the analysis component 204 is comprised of a UDM (Unified Dimensional Model). In still yet another instance of the present invention, the cache 206 is comprised of a MOLAP cache and the like. Other instances of the present invention include, but are not limited to, the multidimensional object 208 comprising real-time access analysis data and the cache 206 comprising quick access analysis data. Even other instances of the present invention include a database 210 being comprised of a relational database.

Additional instances of the present invention also include a proactive caching system 202 that is comprised of an analysis component 204, a cache 206, and a multidimensional objects interface 224 that allows for accessing at least one multidimensional object 208. The analysis component having capabilities to control access to the multidimensional objects 208 and to the cache 206. Thus, it is not necessary for the multidimensional objects 208 to be part of the proactive caching system 202. The multidimensional objects 208 can be part of a database management system. The present invention, therefore, allows flexibility in its employment by having a capability to be utilized with existing database management systems. This enhances existing systems, maximizing their usefulness while increasing their performance.

Further instances of the present invention additionally include a proactive caching system 202 that is comprised of an analysis component 204, a cache interface 222 that allows for accessing and controlling a cache 206, and a multidimensional objects interface 224 that allows for accessing at least one multidimensional object 208. Thus, the cache 206 can reside external to the proactive caching system 202. This allows even greater flexibility in implementing the present invention to existing platforms with caching resources already available.

Figure 3:
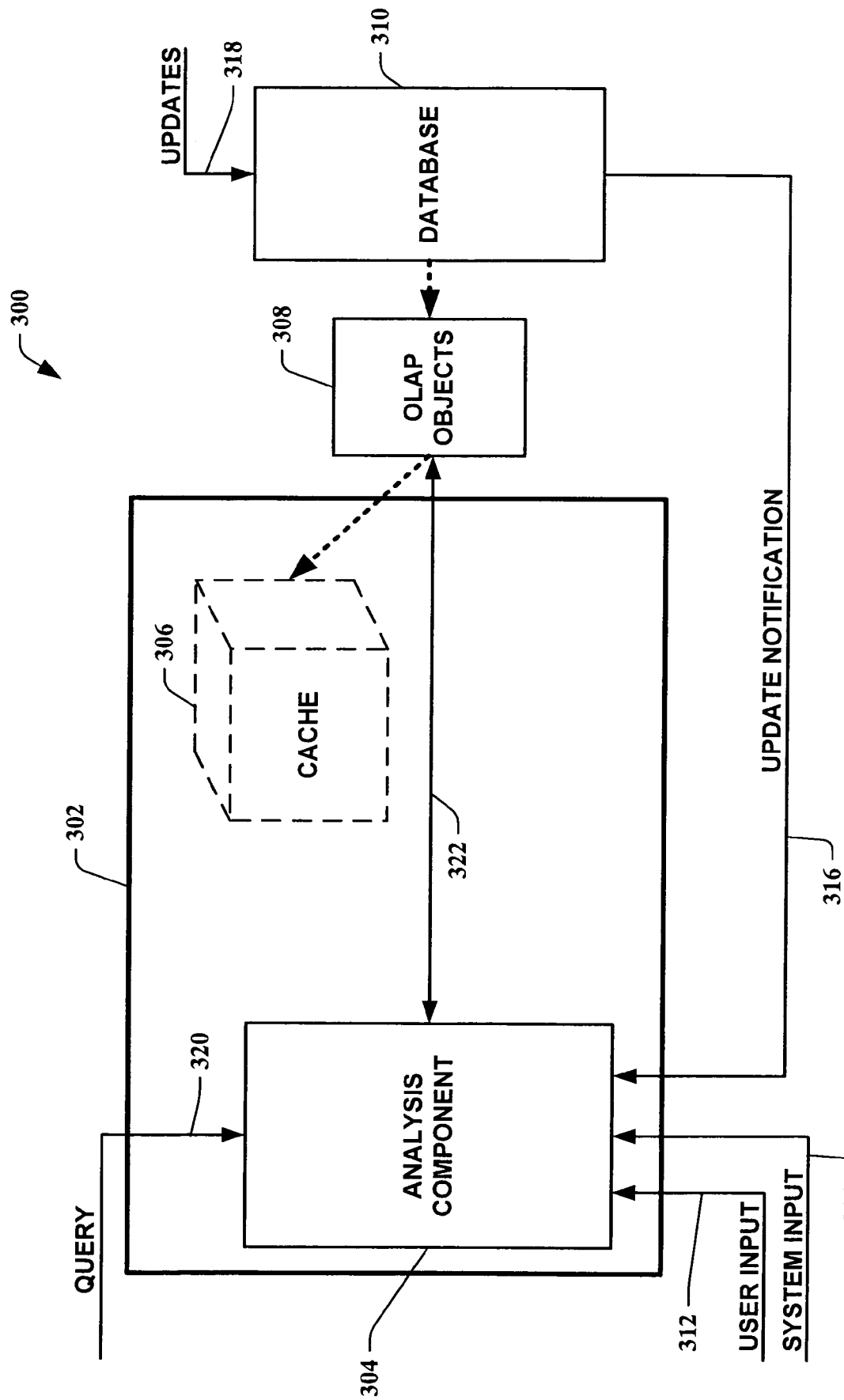
FIG. 3 is another block diagram of a database serving system in accordance with an aspect of the present invention.

Referring to FIG. 3, another block diagram of a database serving system 300 in accordance with an aspect of the present invention is depicted. The database serving system 300 is comprised of a proactive caching system 302, multidimensional objects 308, such as OLAP objects and the like, and a database 310 with a capability of accepting updates 318. The proactive caching system 302 is comprised of an analysis component 304 and a cache 306. In this aspect of the present invention, the analysis component 304 has inputs comprising a query input 320, a user input 312, a system input 314, and a database input 316 for update notifications and the like. In other instances of the present invention, the database input 316 is part of the system input 314. The analysis component 304 has a multidimensional objects interface 322. In this aspect of the present invention, the cache 306 is being built in a background operation based on the multidimensional objects 308. Therefore, the analysis component 304 is not actively interfacing to respond to queries with the cache 306 at this particular time. Thus, the analysis component 304 responds to query inputs 320 by accessing the multidimensional objects 308 only.

Figure 4:
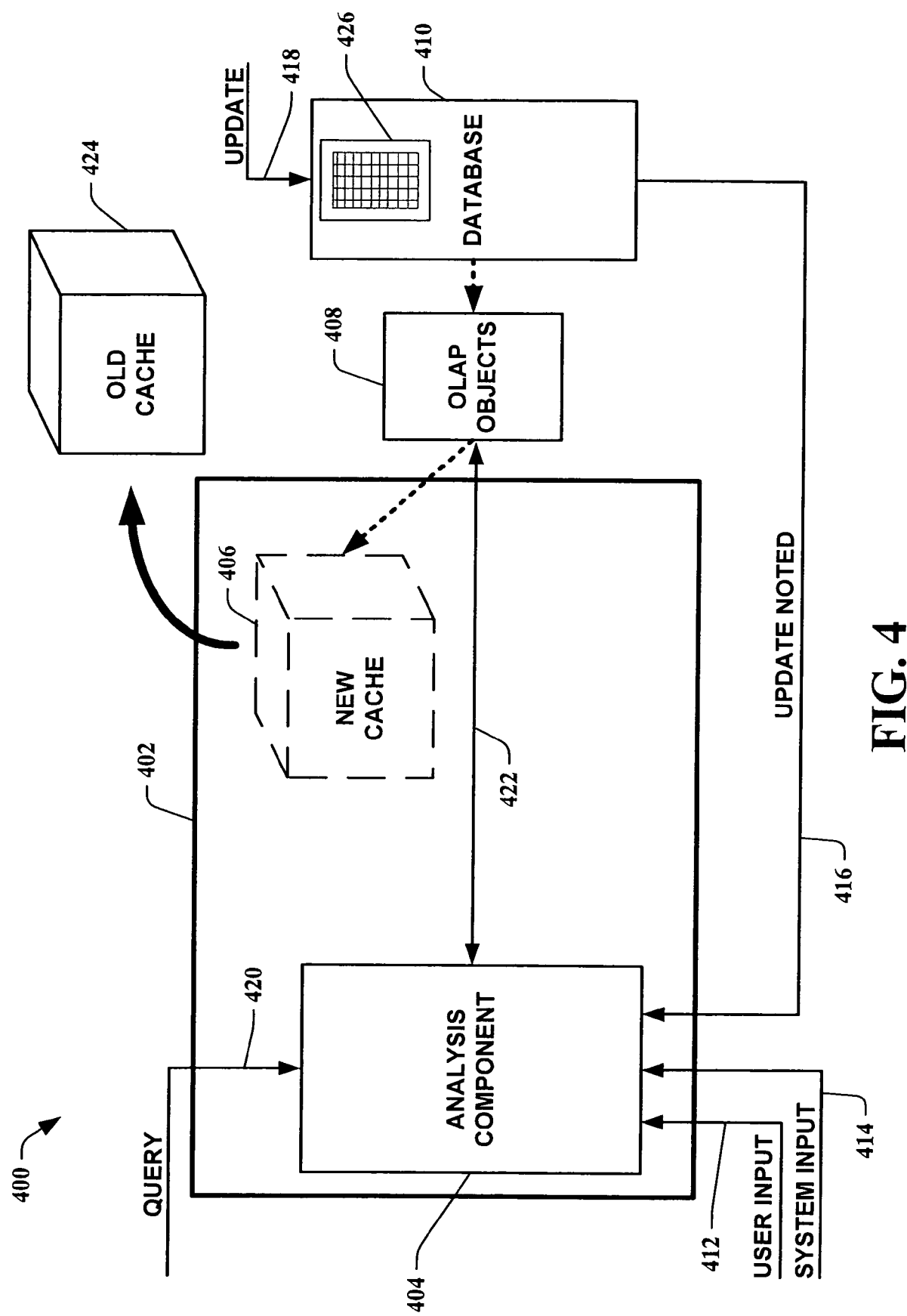
FIG. 4 is yet another block diagram of a database serving system in accordance with an aspect of the present invention.

Moving on to FIG. 4, yet another block diagram of a database serving system 400 in accordance with an aspect of the present invention is illustrated. The database serving system 400 is comprised of a proactive caching system 402, multidimensional objects 408, such as OLAP objects and the like, and a database 410 with a capability of accepting updates 418 to a database table 426. The proactive caching system 402 is comprised of an analysis component 404 and a new cache 406. In this aspect of the present invention, the analysis component 404 has inputs comprising a query input 420, a user input 412, a system input 414, and a database input 416 for update notifications and the like. In other instances of the present invention, the database input 416 is part of the system input 414. The analysis component 404 has a multidimensional objects interface 422. In this aspect of the present invention, the new cache 406 is being built in a background operation from the multidimensional objects 408. Therefore, the analysis component 404 is not actively interfacing to respond to queries with the new cache 406 at this particular time. Thus, the analysis component 404 responds to query inputs 420 by accessing the multidimensional objects 408 only. Additionally, an update 418 is received that affects the database table 426. In this example of one aspect of the present invention, the change in the database table 426 also affects the multidimensional objects 408 from which the query input 420 relies upon for a response. Thus, an old cache 424, based on database data prior to the update 418, is removed and the new cache 406 is built in a background process of the proactive caching system 402 in order to reflect the latest database data update. In other instances of the present invention, the removal of the old cache 424 can be caused by a user input 412 and/or a system input 414.

Figure 5:
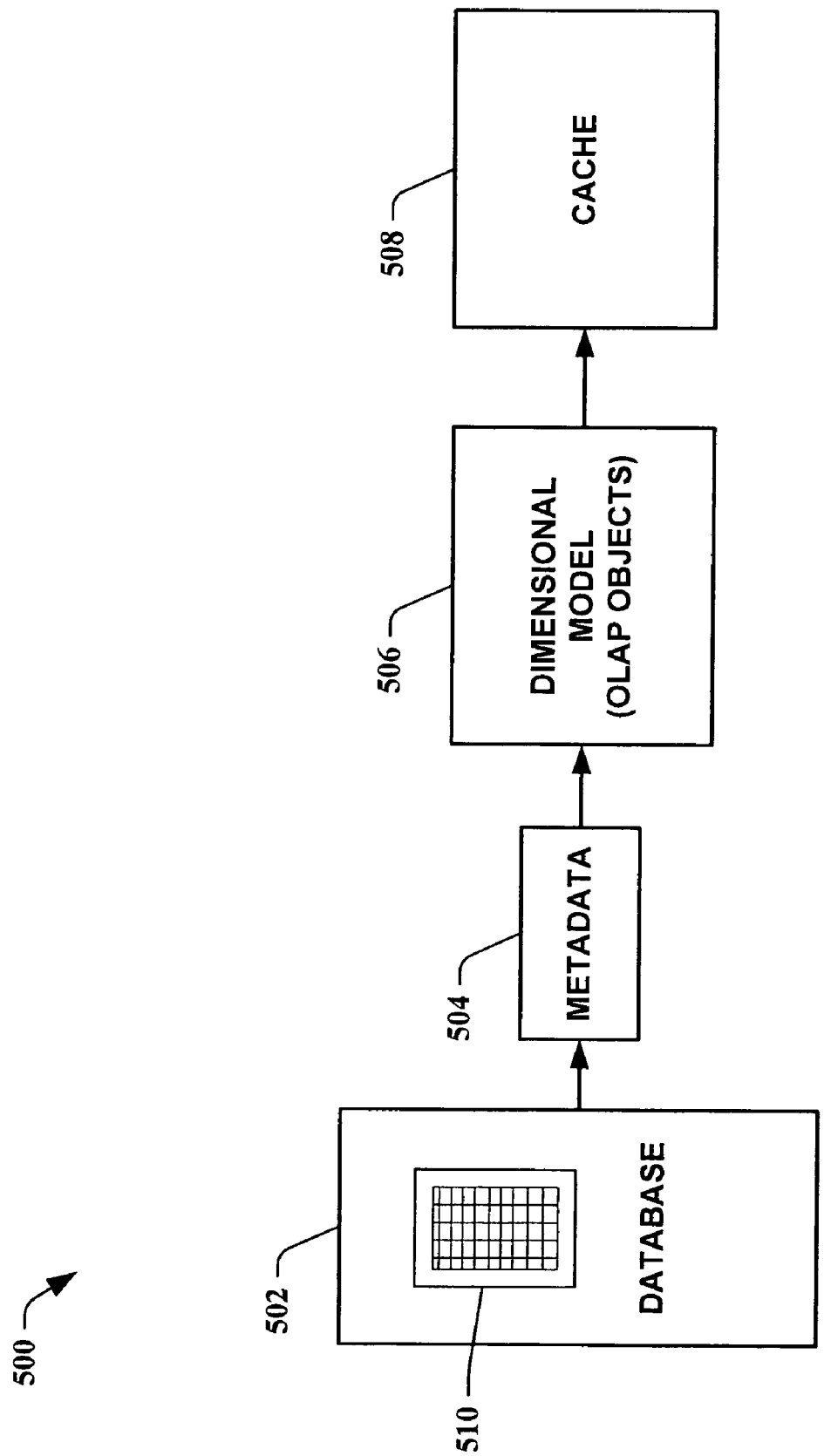
FIG. 5 is a block diagram of a cache development structure in accordance with an aspect of the present invention.

Turning to FIG. 5, a block diagram of a cache development structure 500 in accordance with an aspect of the present invention is shown. The structure 500 is comprised of a database 502 containing a database table 510, a metadata set 504, a dimensional model (multidimensional objects such as "OLAP objects" and the like) 506, and a cache 508. Typically, information about data from the database 502 is compiled into the metadata set 504. Metadata objects are constructed from the metadata set 504 to form the dimensional model 506. The dimensional model 506 usually includes dimensions, cubes, and measures and the like. This allows an OLAP management tree to access the metadata objects in the dimensional model 506. In this manner, a cache 508 with dynamic multidimensional analysis data derived from a multidimensional object based on a relevant database can be constructed from the dimensional model 506.

Figure 6:
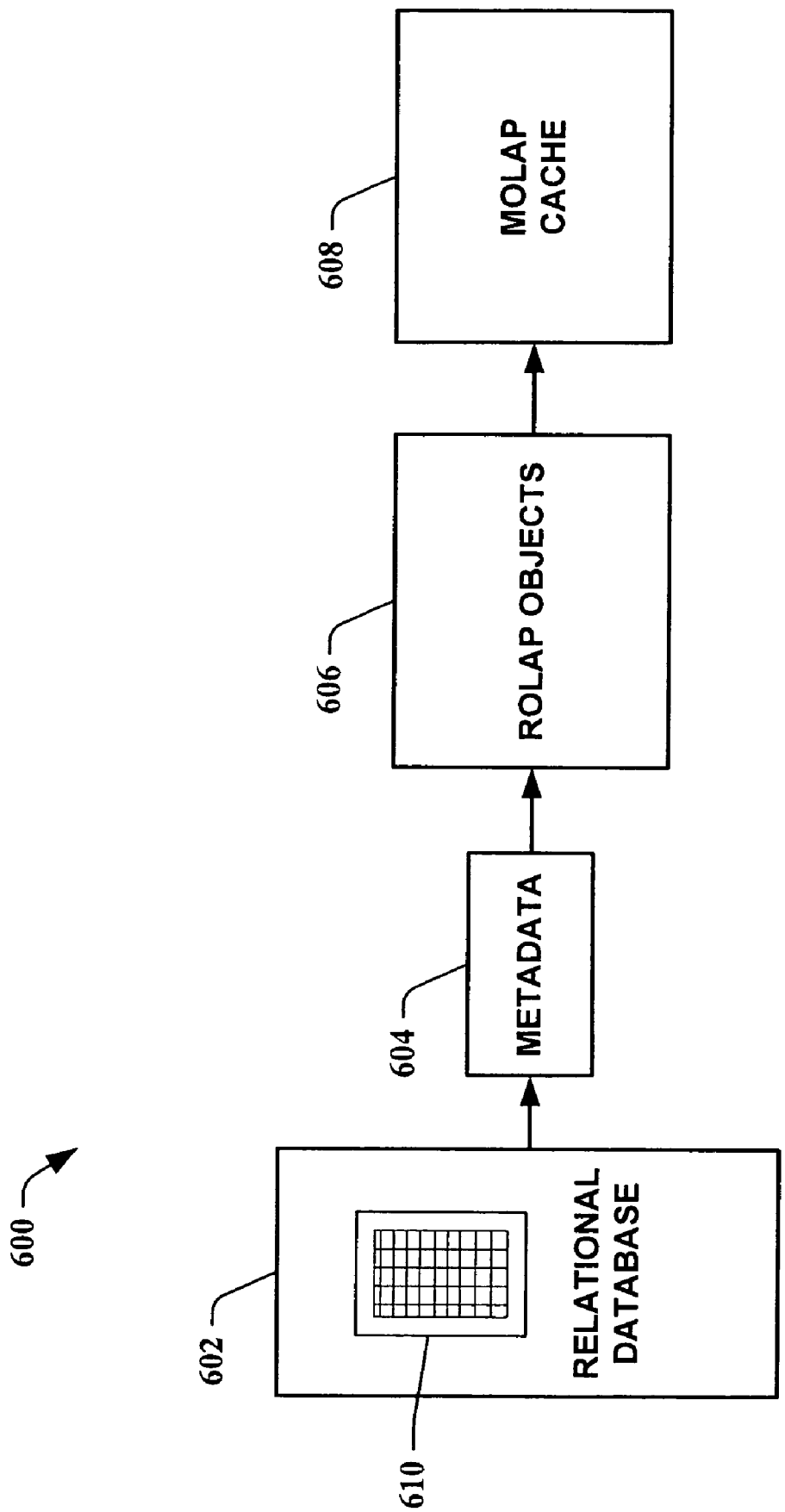
FIG. 6 is another block diagram of a cache development structure in accordance with an aspect of the present invention.

Continuing on with FIG. 6, another block diagram of a cache development structure 600 in accordance with an aspect of the present invention is shown. In this instance of the present invention, the structure 600 is comprised of a relational database 602 containing a relational database table 610, a metadata set 604, ROLAP objects 606, and a MOLAP cache 608. In this example, the MOLAP cache 608 is constructed from ROLAP objects derived from the metadata set 604 and the relational database 610. Having two different OLAP data set variants available (e.g., ROLAP and MOLAP variants and the like), allows for proactively accessing an appropriate data set to transparently deliver a query response in a fashion desired by a user and/or a system.

Figure 7:
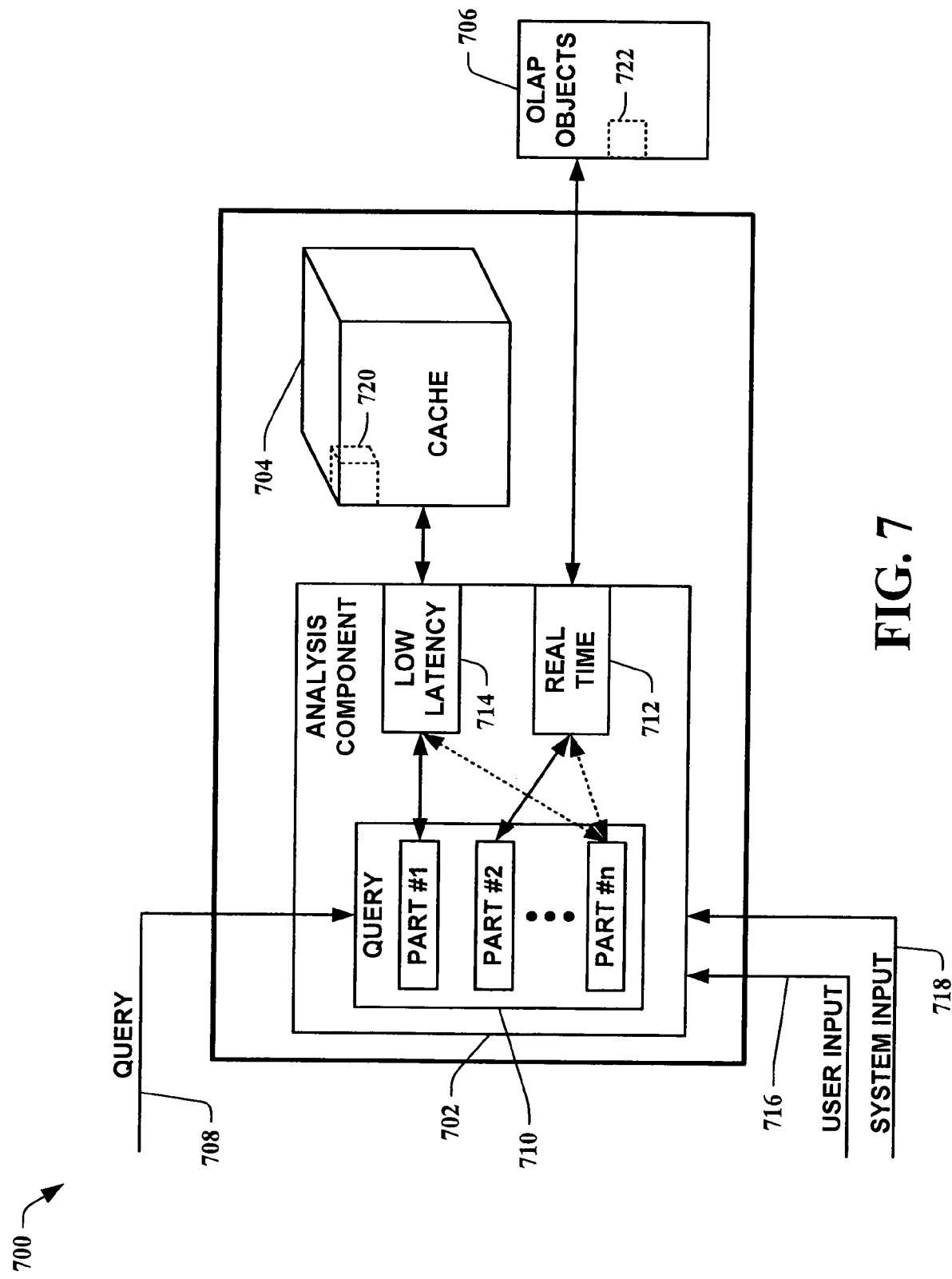
FIG. 7 is a block diagram of a proactive caching system in accordance with an aspect of the present invention.

In FIG. 7, a block diagram of a proactive caching system 700 in accordance with an aspect of the present invention is illustrated. The proactive caching system 700 is comprised of an analysis component 702, a cache 704 with a cache subset 720, and multidimensional objects 706, such as OLAP objects and the like, with a multidimensional objects subset 722. In one aspect of the present invention, the analysis component 702 comprises a query interpreter 710, a low latency terminal 714, and a real-time terminal 712. The analysis component 702 can accept inputs such as a user input 716, a system input 718, and a query input 708 and the like. In one aspect of the present invention, the query interpreter 710 can parse or resolve a complex query into "parts" and proactively decide which terminal 712, 714 is appropriate based upon content of the query input 708. For example, Part #1 can be labeled "time sensitive data" and be directed to the low latency terminal 714 in order to access the cache 704 and, specifically, the cache subset 720. Likewise, Part #2 can be labeled "latest data" and be directed to the real-time terminal 712 in order to access the multidimensional objects 706 and, specifically, the multidimensional objects subset 722. In a similar fashion, Part #n (where "n" represents an integer from 1 to infinity) can be labeled as either of the above categories and be directed to either the cache 706 and/or the multidimensional objects 708. In yet another aspect of the present invention, parsing of the query input 708 can be based on the user input 716 and/or the system input 718 (including database statuses and the like). Although "low latency" and "real-time" are described as "terminals," they are in fact part of the analysis component and do not need to be separate entities as depicted in FIG. 7. Thus, these can be included as part of the query interpreter 710, as part of the cache 706 and/or the multidimensional objects 704 as an embedded filter that controls incoming data, and/or as part of an external filter.

Figure 8:
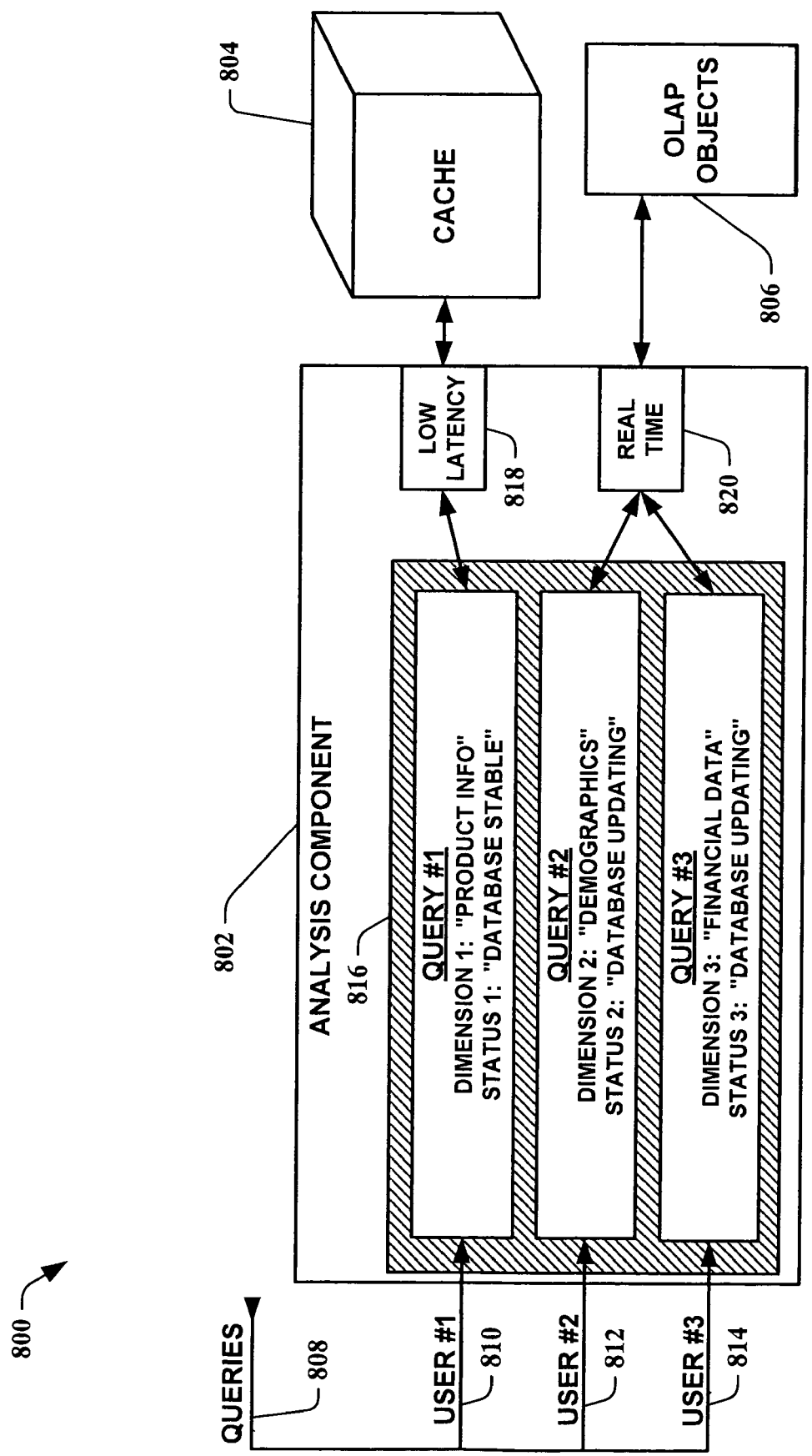
FIG. 8 is another block diagram of a proactive caching system in accordance with an aspect of the present invention.

Referring to FIG. 8, another block diagram of a proactive caching system 800 in accordance with an aspect of the present invention is shown. The proactive caching system 800 is comprised of an analysis component 802, a cache 804, and multidimensional objects 806, such as OLAP objects and the like. In one aspect of the present invention, the analysis component 802 comprises a query interpreter 816, a low latency terminal 818, and a real-time terminal 820. The query interpreter 816 handles multiple query inputs 808. This can include any number of inputs, but for the sake of a brief illustration, three inputs are shown. These inputs include User #1 input 810, User #2 input 812, and User #3 input 814. Each user input constitutes at least one query which the query interpreter 816 analyzes. For example, if the first User #1 input contains Query #1 with a dimension of "product info" and database status relative to that information of "database stable", the query interpreter 816 can direct that access to the low latency terminal 818 for accessing the cache 804. The cache 804 can be a multidimensional OLAP cache with fast response time and the like. If the second User #2 input contains Query #2 with a dimension of "demographics" and database status relative to that information of "database updating", the query interpreter 816 can direct that access to the real-time terminal 820 for accessing the multidimensional objects 806. The multidimensional objects' characteristics can include real-time data access and the like. Likewise, if the third User #3 input has a dimension of "financial data" and a database status relative to that information of "database updating", the query interpreter 816 can direct that access to the real-time terminal 820 for accessing the multidimensional objects 806. In this fashion, the proactive caching system 800 provides a user with desired responses without having active user input as to which cache is to be utilized. However, the present invention does not preclude utilizing user and/or system inputs to determine how and/or when to proactively cache.

Figure 9:
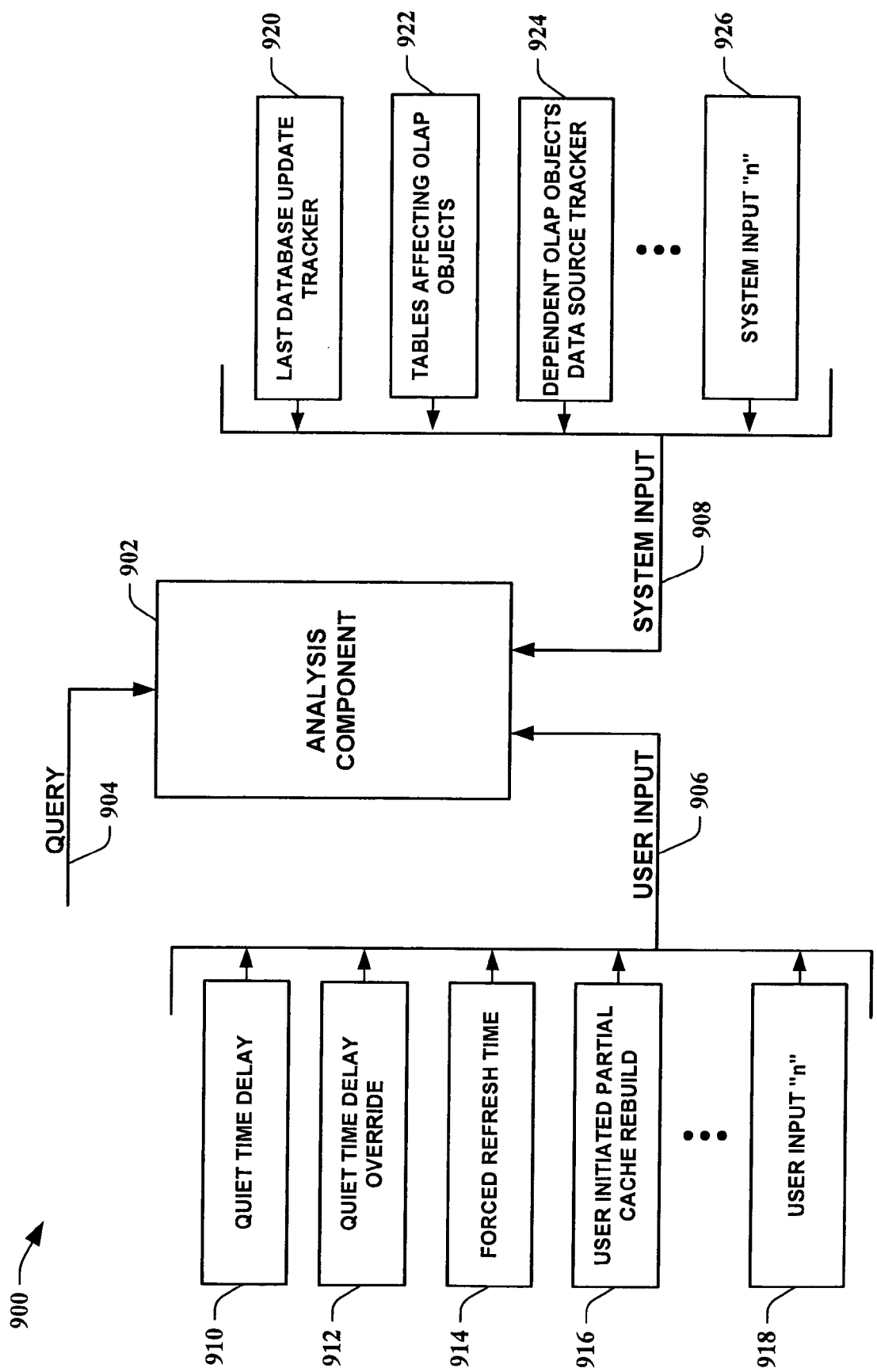
FIG. 9 is a block diagram of proactive caching system inputs in accordance with an aspect of the present invention.

Turning to FIG. 9, a block diagram of proactive caching system inputs 900 in accordance with an aspect of the present invention is illustrated. As described supra, an analysis component 902 can have multiple inputs. These include, but are not limited to, query inputs 904, user inputs 906, and system inputs 908. User inputs 906 include, but are not limited to, quiet time delay 910, quiet time delay override 912, forced refresh time 914, user initiated partial cache rebuild 916, and user input "n" 918 (where "n" represents any unlimited number and/or types of inputs), and the like. System inputs 908 include, but are not limited to, last database update tracker 920, tables affecting OLAP objects 922, dependent OLAP objects data source tracker 924, and system input "n" 926 (where "n" represents any unlimited number and/or types of inputs), and the like.

Quiet time delay 910 is comprised of a means to keep track of how much time has passed since a database has been updated relative to some pertinent information. That pertinent information can be an actual data table entry and/or an OLAP object. Quiet time override 912 is comprised of a means determined by a system and/or a user to override and rebuild a cache even though the quiet time delay 910 has not been met. This prevents a cache from never being updated due to sporadic but frequent updates to a database, always occurring just before the quiet time delay 910 is reached. Forced refresh time 914 is comprised of a means to force a refresh of the cache at a given interval. This prevents a cache from containing stale data in spite of the fact that a database has not reported any updates within the forced refresh time 914. This also ensures that even in a case where the database is unable to send status data, the cache can be updated. User initiated partial cache rebuild 916 is comprised of a means to allow a user to control what portion and/or when that portion of the cache is to be rebuilt. This allows a user to selectively decide if a particular subset, for example, should be rebuilt while retaining other data for quick accessibility. User input "n" 918 is comprised of any means for aiding in proactive caching by the analysis component 902. One skilled in the art can appreciate that many different timing parameters and/or data parameters can be input by a user to aid in more effectively utilizing proactive caching. One such means, for example, includes allowing a user to input manual changes to mark certain tables/views/OLAP objects as requiring an update.

Last database update tracker 920 is comprised of a means to track when the database was last updated. This input can be utilizes along with other inputs to determine the staleness of cache data and the like. Tables affecting OLAP objects 922 is comprised of a means to track/list database table data that is related to an OLAP object that a cache is based upon. This allows filtering of caching updates to prevent updating the cache when a database has an unrelated table update. Dependent OLAP objects data source tracker 924 is comprised of a means to track a dependency of cache data to a particular OLAP object. This also allows filtering of caching updates to prevent updating a cache when an unrelated OLAP object changes. System input "n" 926 is comprised of any means for aiding in proactive caching by the analysis component 902. One skilled in the art can appreciate that many different timing parameters and/or data parameters can be input by a system to aid in more effectively utilizing proactive caching. This includes, but is not limited to, database update notifications and the like also.

It is important to note that although the above input parameters are illustrated as going to the analysis component 902, the analysis component 902 itself can include subcomponents that provide functionality to perform the functions necessary to utilize the inputs described above. It is also possible for external components to the analysis component 920 to provide some and/or all of the functionality required.

Figure 10:
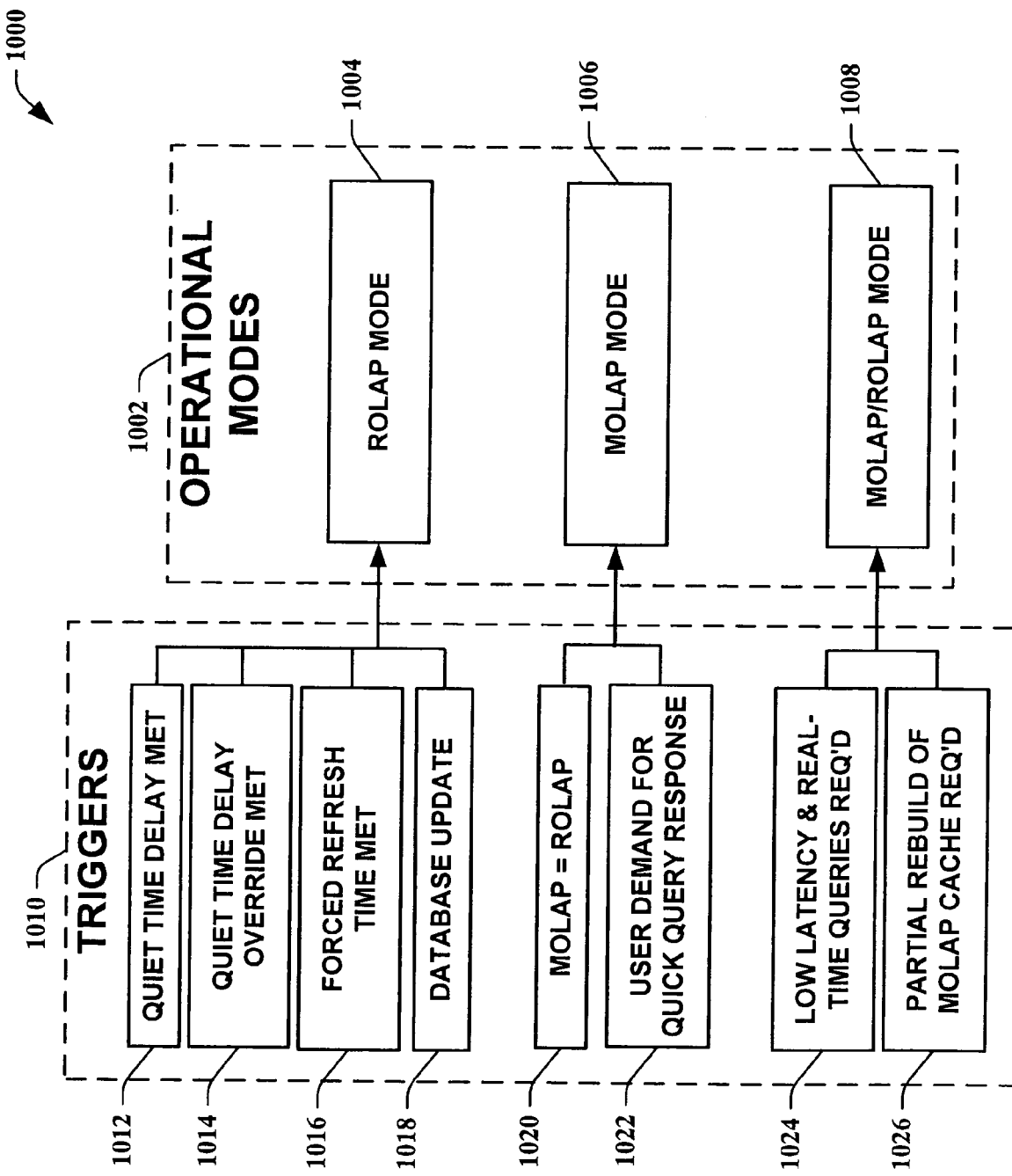
FIG. 10 is a block diagram of proactive caching system parameters in accordance with an aspect of the present invention.

In FIG. 10, a block diagram of proactive caching system parameters 1000 in accordance with an aspect of the present invention are shown. In one instance of the present invention, the proactive caching system parameters 1000 are comprised of operational modes 1002 and triggers 1010 and the like. The operational modes are comprised of ROLAP Mode 1004, MOLAP mode 1006, and MOLAP/ROLAP mode 1008 and the like. The triggers 1010 for ROLAP Mode 1004 are comprised of quiet time delay met 1012, quiet time delay override met 1014, forced refresh time met 1016, and database update 1018 and the like. The triggers 1010 for MOLAP Mode 1006 are comprised of an equivalent MOLAP and ROLAP data set 1020 and a user demand for quick query response 1022 over a need for real-time data and the like. The triggers 1010 for MOLAP/ROLAP Mode are comprised of when low latency and real-time queries are both required 1024 and when partial rebuilding of a MOLAP cache is required 1026.

ROLAP Mode 1004 allows only ROLAP data to be accessed for queries. This is typically a slower mode with real-time data access. MOLAP Mode 1006 only allows MOLAP data to be accessed for queries and is typically a default mode due to its quick performance. To ensure data integrity and increased performance, MOLAP Mode can be employed anytime MOLAP data equals ROLAP data. This insures that no data accuracy is lost by utilizing the faster means. It can also be employed by a user demanding quick access over a need for real-time data and the like (other user inputs). MOLAP/ROLAP Mode 1008 is a hybrid mode that allows access to both MOLAP and ROLAP data. This permits a user and/or system to retrieve any type of data desired at any type of latency desired. It also permits partial rebuilding of the MOLAP cache with ROLAP objects providing information for that portion of the MOLAP cache under construction.

One skilled in the art can appreciate that the aforementioned triggers and operational modes are in no way exhaustive lists. FIG. 10 represents an example only of one aspect of the present invention. Additional modes and triggers can also be employed within the scope of the present invention as well.

Figure 11:
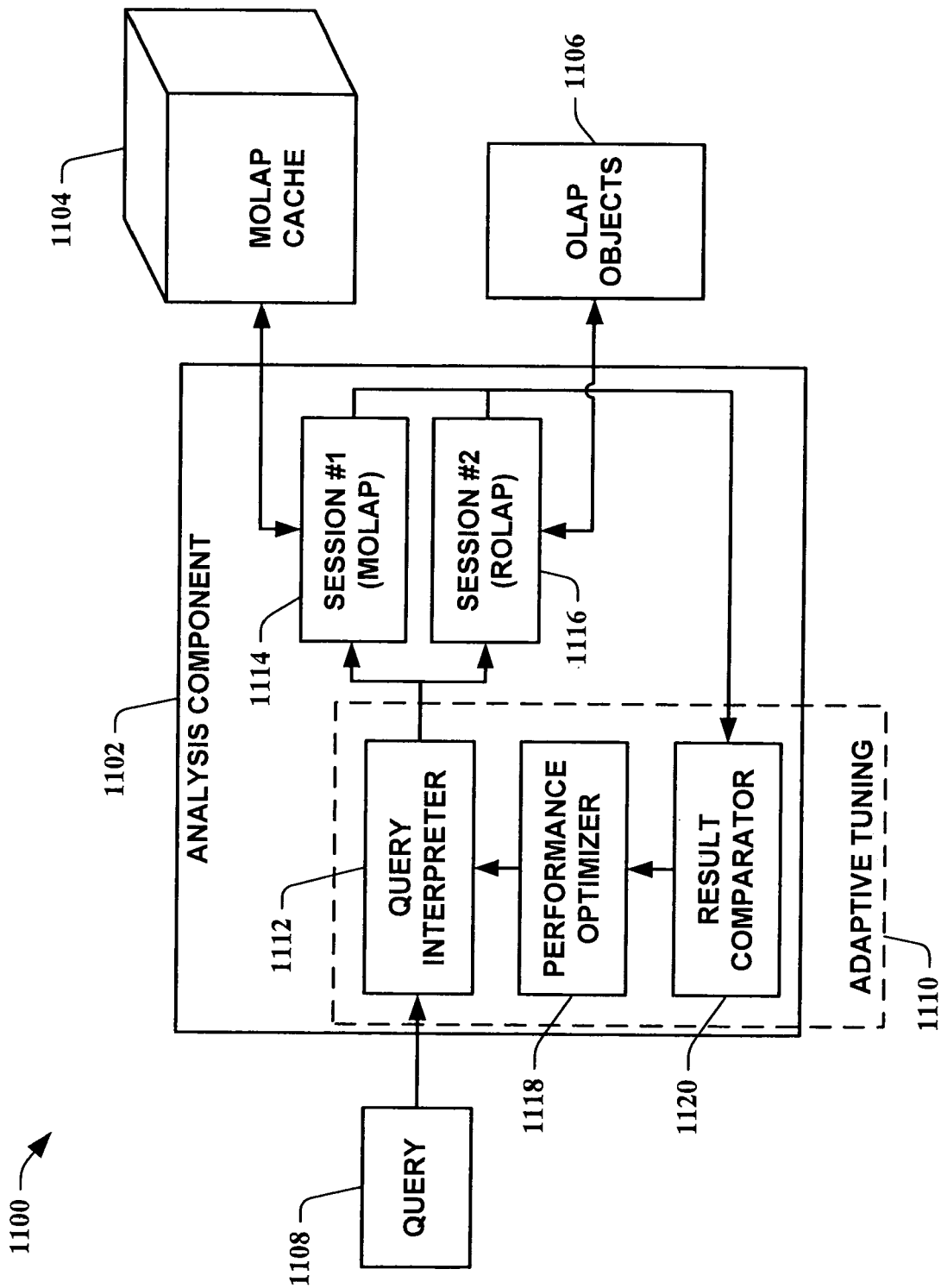
FIG. 11 is yet another block diagram of proactive caching system in accordance with an aspect of the present invention.

Looking at FIG. 11, yet another block diagram of proactive caching system 1100 in accordance with an aspect of the present invention is illustrated. The proactive caching system comprising an analysis component 1102, a MOLAP cache 1104, and OLAP objects 1106. The analysis component 1102 comprising an adaptive tuning component 1110, a first session 1114, and a second session 1116. The adaptive tuning component 1110 comprising a query interpreter 1112, a performance optimizer 1118, and a result comparator 1120. A typical query 1108 is input into the query interpreter 1112. In this aspect of the present invention, the query interpreter 1112 is part of the adaptive tuning component 1110. Therefore, for performance tuning, the query interpreter 1112 establishes a dual session with the same query 1108. Thus, the query 1108 is sent via session #1 1114 to the MOLAP cache 1104 and via session #2 1116 to the OLAP objects 1106. Each session 1114, 1116 produces a response that is sent to the result comparator 1120. The result comparator 1120, in turn, determines any differences between the two sessions 1114, 1116. These differences, if any, are reported to the performance optimizer 1118. The performance optimizer 1118 tracks the differences and adaptively alters how the query interpreter 1112 reacts to future queries. One skilled in the art will recognize that not all queries need to be continuously processed via the two sessions 1114, 1116. Once a particular query has been optimized, an occasional sampling is all that is required. "Occasional" can be per minute, hourly, daily, monthly and/or yearly and the like depending on the frequency that data is queried. For example, previous sales records from a year ago can result in identical results whether via session #1 1114 or session #2 1116. Thus, when queried about sales records for the same time period, the performance optimizer 1118 instructs the query interpreter 1112 to only utilize the MOLAP cache 1104 for a quick response. The performance optimizer 1118 can track data, usage, and associated parameters to provide adaptive tuning even to user settings, possibly providing a user with performance suggestions.

In view of the exemplary systems shown and described above, methodologies that may be implemented in accordance with the present invention will be better appreciated with reference to the flow charts of FIGS. 12-17. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 12:
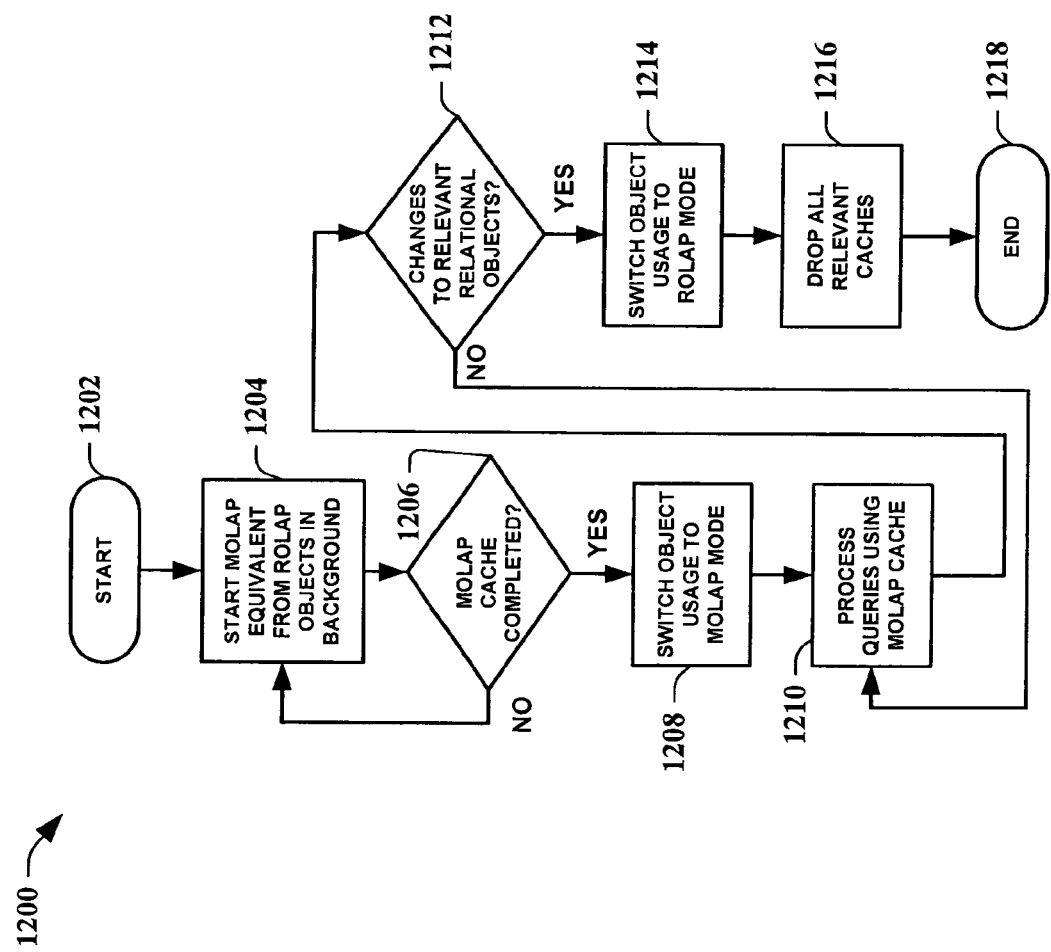
FIG. 12 is a flow diagram illustrating a method of proactive caching in accordance with an aspect of the present invention.

Turning to FIG. 12, a flow diagram illustrating a method 1200 of proactive caching in accordance with an aspect of the present invention is depicted. The method 1200 starts 1202 by beginning to build a MOLAP cache equivalent of ROLAP objects in a background process 1204. A determination is then made to detect when the MOLAP cache is completed 1206. When completed, operational mode is switched to utilizing the MOLAP mode 1208. Queries are then processed employing the MOLAP cache 1210. A determination is then made as to whether there has been any relevant change to the ROLAP objects 1212. This can include any relevant changes to any underlying data also. If no relevant changes have been made, queries are continued to be processed utilizing the MOLAP cache 1210. However, if changes are present, the operational mode is switched to ROLAP mode 1214. All relevant caches are then dropped 1216, ending the flow 1218. This cycle can be repeated indefinitely in order to keep the MOLAP cache fresh in spite of any relevant database changes.

Figure 13:
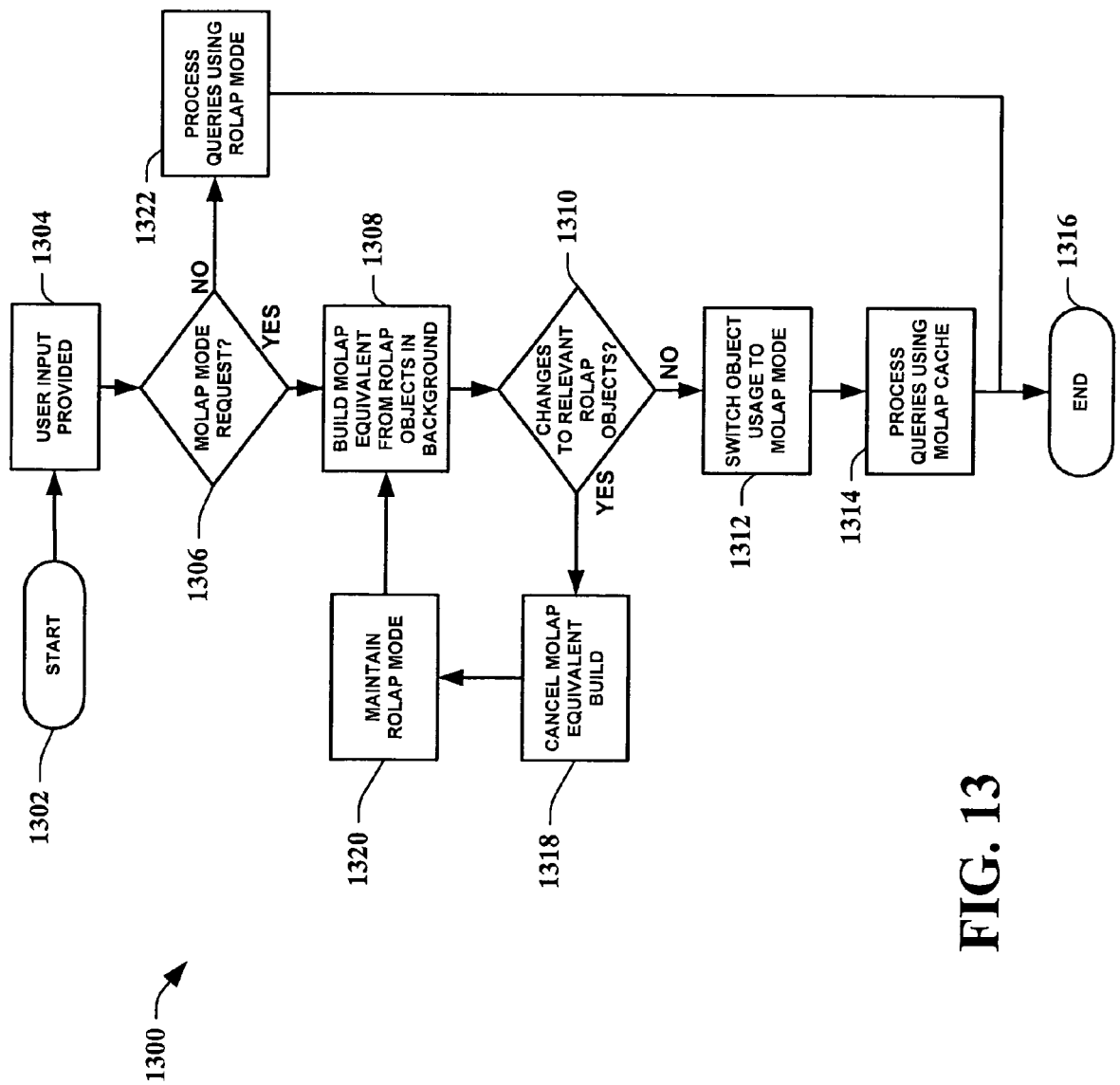
FIG. 13 is another flow diagram illustrating a method of proactive caching in accordance with an aspect of the present invention.

Moving on to FIG. 13, another flow diagram illustrating a method 1300 of proactive caching in accordance with an aspect of the present invention is shown. The method 1300 starts 1302 by providing a user input 1304. A determination is made as to whether a MOLAP mode request was made 1306. If not, queries are continued to be processed utilizing ROLAP mode 1322, ending the flow 1316. However, if a MOLAP mode request is made, a MOLAP equivalent of ROLAP objects are built as a background process 1308. A determination is then made as to whether changes relevant to the ROLAP objects have occurred 1310. If changes have occurred, the MOLAP equivalent build is canceled 1318, the operational mode is switched to ROLAP mode 1320, and a MOLAP equivalent of the ROLAP objects is again constructed 1308. However, if no relevant changes have occurred after completing the build of the MOLAP cache, the operational mode is switched to MOLAP mode 1312 and query processing utilizes the MOLAP cache 1314, ending the flow 1316.

Figure 14:
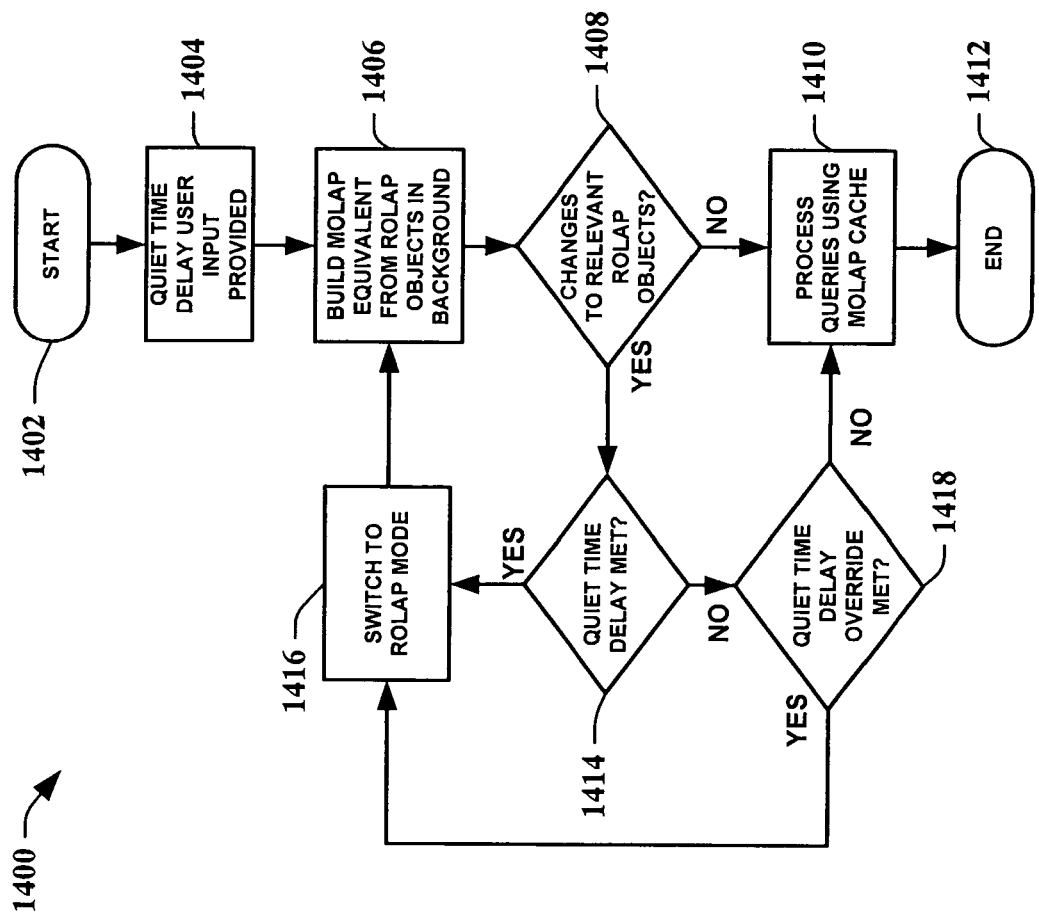
FIG. 14 is yet another flow diagram illustrating a method of proactive caching in accordance with an aspect of the present invention.

Referring to FIG. 14, yet another flow diagram illustrating a method 1400 of proactive caching in accordance with an aspect of the present invention is illustrated. The method 1400 begins 1402 with a quiet time delay user input provided 1404. A MOLAP equivalent of ROLAP objects is constructed in a background process 1406. A determination is then made as to whether any relevant changes have occurred to the ROLAP objects 1408. If no changes have occurred, queries are processed utilizing the MOLAP cache 1410, ending the flow 1412. However, if changes have occurred to the ROLAP objects, a determination is made as to whether the quiet time delay has been met 1414. If not, a determination is made as to whether a quiet time delay override has been met 1418. If the quiet time delay override has not been met, the queries are processed using the MOLAP cache 1410, ending the flow 1412. However, if the quiet time delay override has been met, an operational mode is switched to ROLAP mode and a MOLAP cache is once again constructed 1406. If, however, the quiet time delay has been met after detecting relevant changes to the ROLAP objects, the operational mode is switched to ROLAP mode 1416 and the MOLAP cache is built in a back ground process 1406, continuing the cycle.

Figure 15:
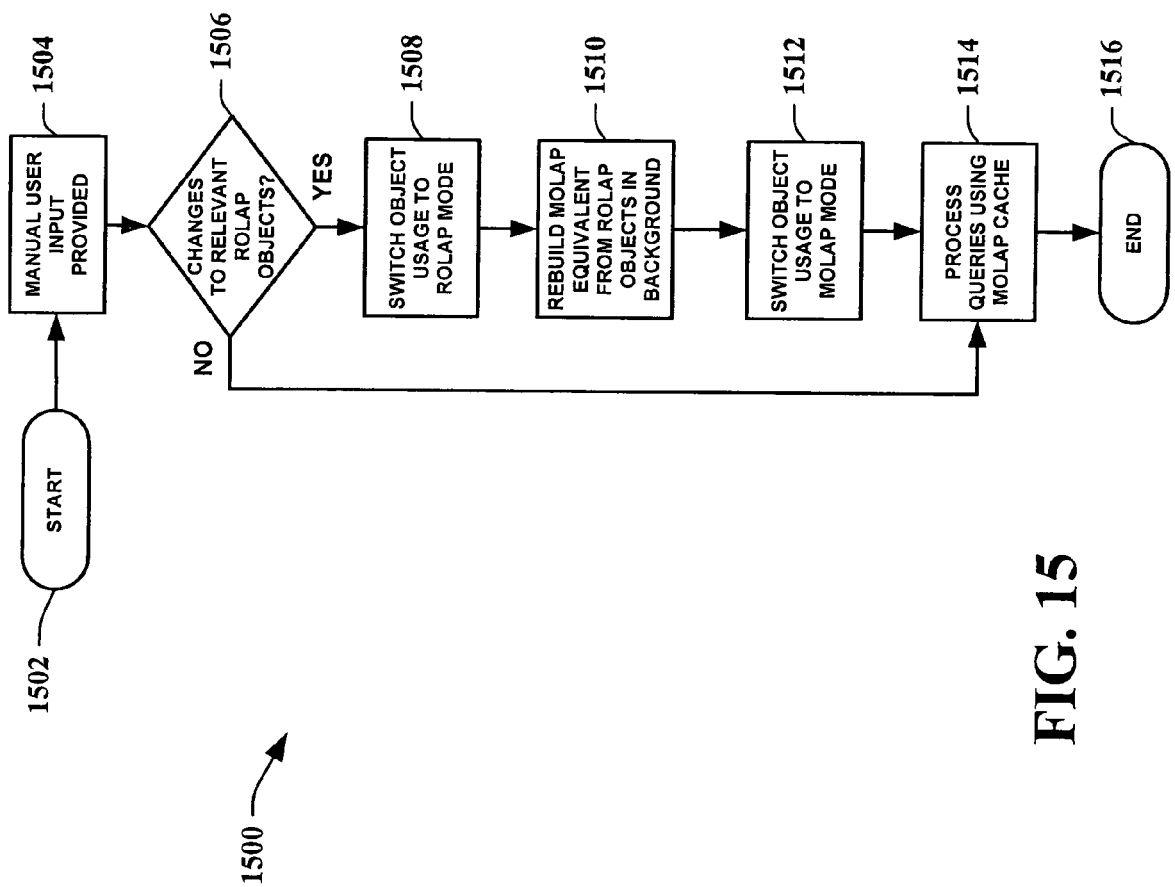
FIG. 15 is still yet another flow diagram illustrating a method of proactive caching in accordance with an aspect of the present invention.

Turning to FIG. 15, still yet another flow diagram illustrating a method 1500 of proactive caching in accordance with an aspect of the present invention is shown. The method 1500 starts 1502 by providing a manual user input 1504. The manual user input contains parameters that allow a user to designate certain tables/views/objects and the like as "dirty" (i.e., in need of updating if they are required to be accessed). A determination 1506 is made as to whether any relevant changes have occurred to ROLAP objects 1506. This takes into account that dirty inputs may change data relevant to cached data. If no relevant changes have occurred, queries are processed employing a MOLAP cache 1514, ending the flow 1516. Typically, due to a higher performance gain, utilizing MOLAP cache is a default condition for a proactive caching system and is performed unless directed otherwise by a user and/or a system. However, if relevant changes have occurred to the ROLAP objects 1506 (due to the dirty inputs and/or database updates and the like), operational mode is switched to ROLAP mode 1508. The MOLAP cache is then rebuilt in a background process 1510, and the operational mode is switched to MOLAP mode once again 1512 when the cache is completed. Query processing then continues to employ the MOLAP cache 1514, ending the flow 1516.

Figure 16:
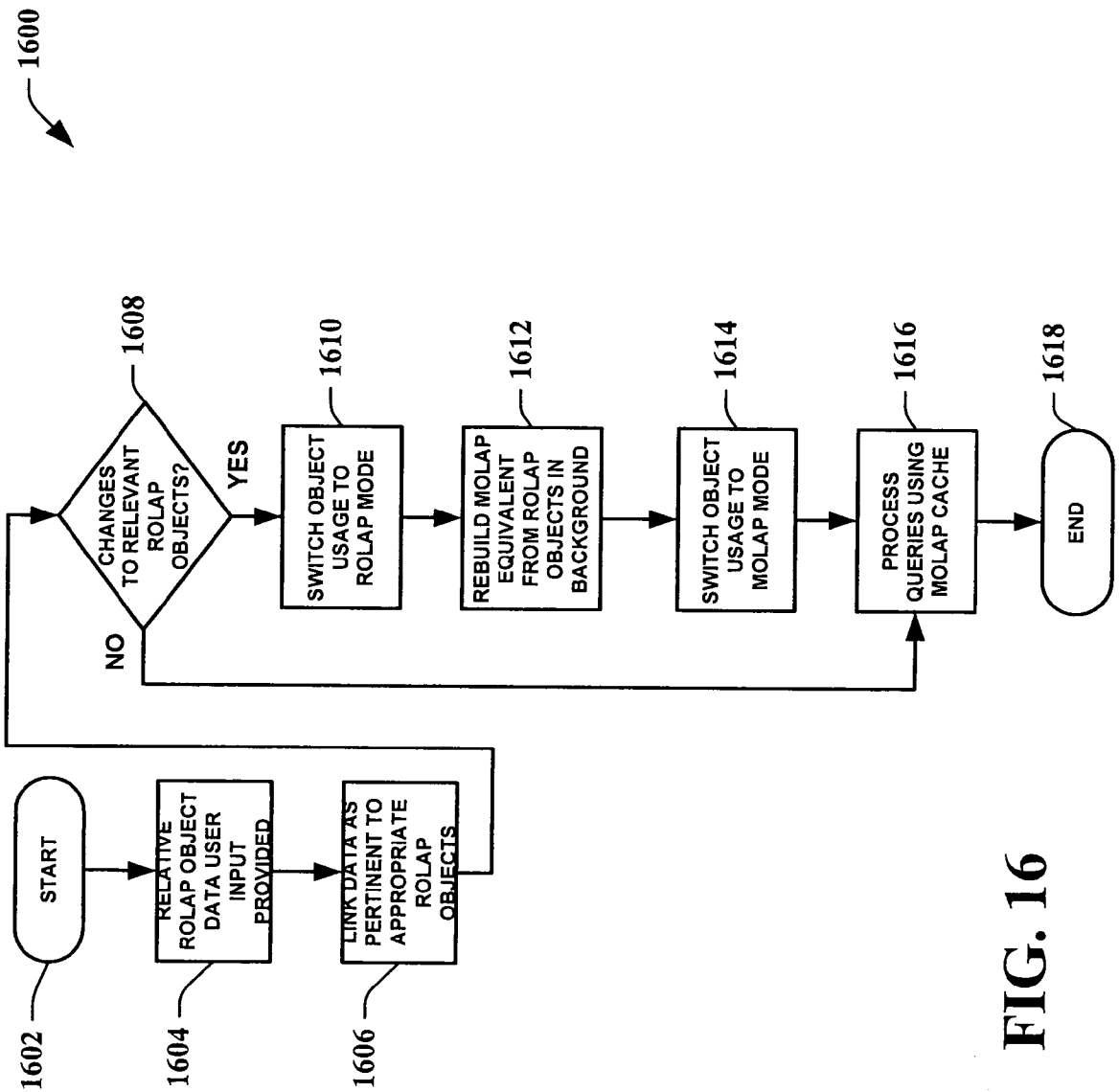
FIG. 16 is still yet another flow diagram illustrating a method of proactive caching in accordance with an aspect of the present invention.

In FIG. 16, still yet another flow diagram illustrating a method 1600 of proactive caching in accordance with an aspect of the present invention is shown. The method 1600 starts 1602 by a user providing relative ROLAP object data inputs 1604. The input data is then linked to appropriate ROLAP objects as being pertinent 1606. In this manner, a user can tag data as being relative to cached data even though it was not derived specifically from this data. A determination is then made as to whether any relevant changes have occurred to ROLAP objects. This checks to see if the new data links have established links from the ROLAP objects to data that has changed. If no changes are found, queries are processed employing a MOLAP cache 1616, ending the flow 1618. Due to performance gains, MOLAP mode is considered the default mode. However if changes have been made to relevant ROLAP objects 1608, operational mode is switched to ROLAP mode 1610. A MOLAP cache is then rebuilt from the ROLAP objects in a background process 1612. Once completed, the operational mode is switched to MOLAP mode 1614 and queries are once again processed utilizing the MOLAP cache 1616, ending the flow 1618.

Figure 17:
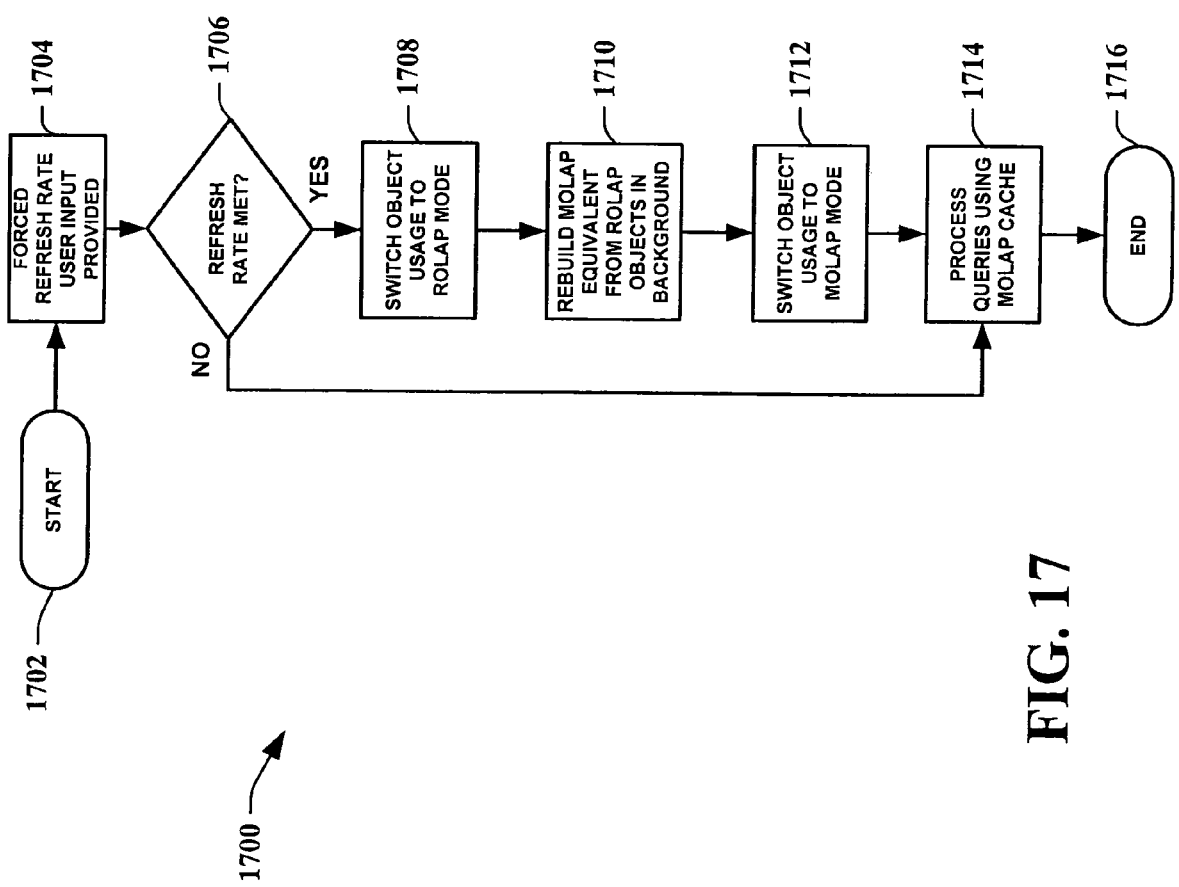
FIG. 17 is still yet another flow diagram illustrating a method of proactive caching in accordance with an aspect of the present invention.

Looking at FIG. 17, still yet another flow diagram illustrating a method 1700 of proactive caching in accordance with an aspect of the present invention is depicted. The method 1700 starts 1702 with a user providing a forced refresh rate input 1704. A determination is then made as to whether this input has been met 1706. If not, queries are processed utilizing a MOLAP cache 1714, ending the flow 1716. Due to performance gains, MOLAP mode is considered the default mode. However, if the forced refreshed rate input has been met 1706, operational mode is switched to ROLAP mode 1708. The MOLAP cache is then rebuilt as a background process 1710. Once completed, the operation mode is then switched back to MOLAP mode 1712 and queries are processed employing the MOLAP cache 1714, ending the flow 1716.

The aforementioned flows are meant to be representative flows of various methods of the present invention. They in no way encompass every iteration and variance within the scope of the present invention. Those skilled in the art can appreciate that a method can incorporate modifications and still remain within the purview of the present invention.

Figure 18:
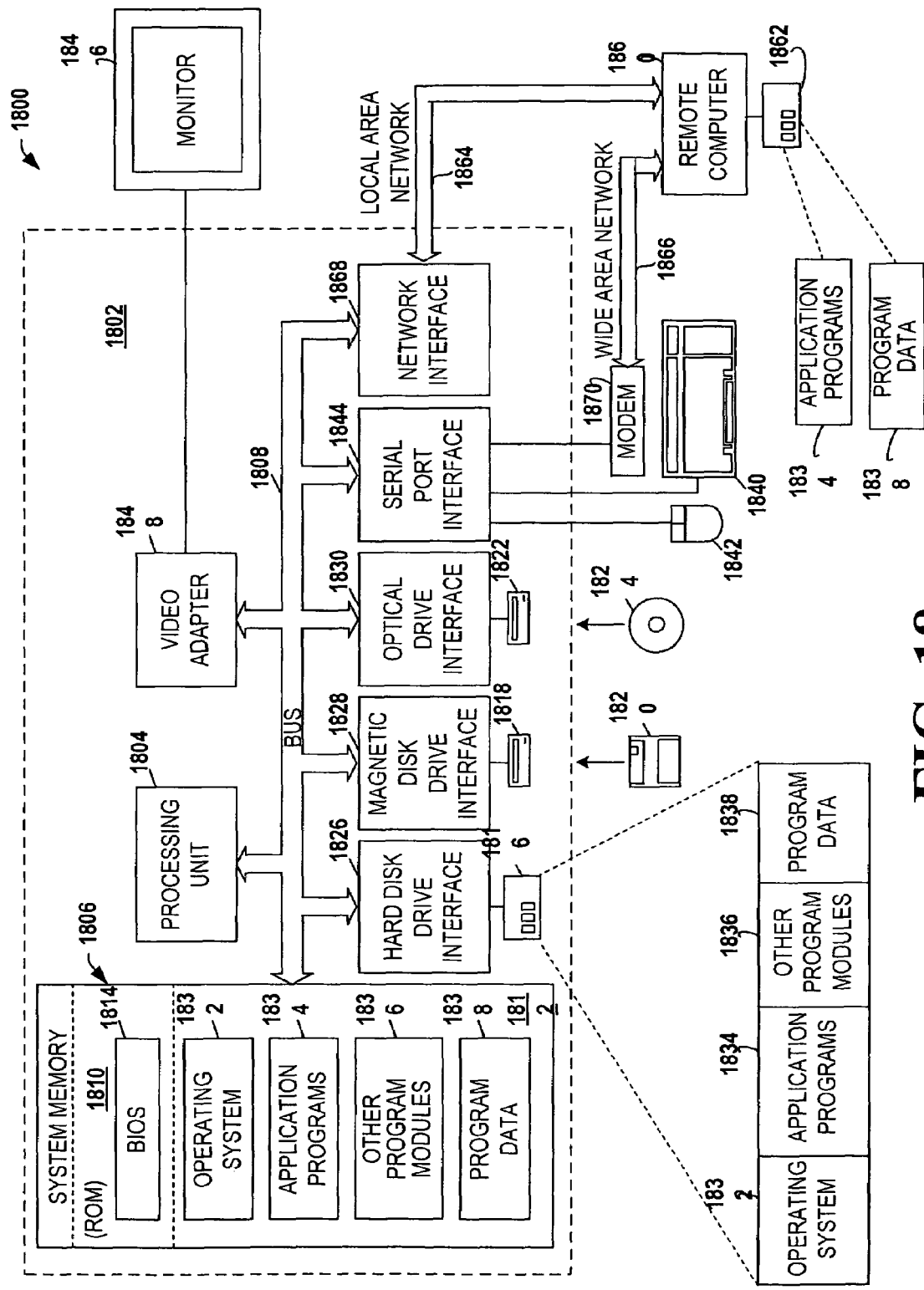
FIG. 18 illustrates an example operating environment in which the present invention can function.

In order to provide additional context for implementing various aspects of the present invention, FIG. 18 and the following discussion are intended to provide a brief, general description of a suitable computing environment 1800 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 18, an exemplary system environment 1800 for implementing the various aspects of the invention includes a conventional computer 1802, including a processing unit 1804, a system memory 1806, and a system bus 1808 that couples various system components, including the system memory, to the processing unit 1804. The processing unit 1804 may be any commercially available or proprietary processor. In addition, the processing unit may be implemented as multi-processor formed of more than one processor, such as may be connected in parallel.

The system bus 1808 may be any of several types of bus structure including a memory bus or memory controller, a peripheral bus, and a local bus using any of a variety of conventional bus architectures such as PCI, VESA, Microchannel, ISA, and EISA, to name a few. The system memory 1806 includes read only memory (ROM) 1810 and random access memory (RAM) 1812. A basic input/output system (BIOS) 1814, containing the basic routines that help to transfer information between elements within the computer 1802, such as during start-up, is stored in ROM 1810.

The computer 1802 also may include, for example, a hard disk drive 1816, a magnetic disk drive 1818, e.g., to read from or write to a removable disk 1820, and an optical disk drive 1822, e.g., for reading from or writing to a CD-ROM disk 1824 or other optical media. The hard disk drive 1816, magnetic disk drive 1818, and optical disk drive 1822 are connected to the system bus 1808 by a hard disk drive interface 1826, a magnetic disk drive interface 1828, and an optical drive interface 1830, respectively. The drives 1816-1822 and their associated computer-readable media provide nonvolatile storage of data, data structures, computer-executable instructions, etc. for the computer 1802. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1800, and further that any such media may contain computer-executable instructions for performing the methods of the present invention.

A number of program modules may be stored in the drives 1816-1822 and RAM 1812, including an operating system 1832, one or more application programs 1834, other program modules 1836, and program data 1838. The operating system 1832 may be any suitable operating system or combination of operating systems. By way of example, the application programs 1834 and program modules 1836 can include a database serving system and/or a proactive caching system that utilizes data in accordance with an aspect of the present invention. Additionally, the program data 1838 can include input data for controlling and/or biasing a proactive caching system in accordance with an aspect of the present invention.

A user can enter commands and information into the computer 1802 through one or more user input devices, such as a keyboard 1840 and a pointing device (e.g., a mouse 1842). Other input devices (not shown) may include a microphone, a joystick, a game pad, a satellite dish, wireless remote, a scanner, or the like. These and other input devices are often connected to the processing unit 1804 through a serial port interface 1844 that is coupled to the system bus 1808, but may be connected by other interfaces, such as a parallel port, a game port or a universal serial bus (USB). A monitor 1846 or other type of display device is also connected to the system bus 1808 via an interface, such as a video adapter 1848. In addition to the monitor 1846, the computer 1802 may include other peripheral output devices (not shown), such as speakers, printers, etc.

It is to be appreciated that the computer 1802 can operate in a networked environment using logical connections to one or more remote computers 1860. The remote computer 1860 may be a workstation, a server computer, a router, a peer device or other common network node, and typically includes many or all of the elements described relative to the computer 1802, although, for purposes of brevity, only a memory storage device 1862 is illustrated in FIG. 18. The logical connections depicted in FIG. 18 can include a local area network (LAN) 1864 and a wide area network (WAN) 1866. Such networking environments are commonplace in offices, enterprise-wide computer networks, intranets and the Internet.

When used in a LAN networking environment, for example, the computer 1802 is connected to the local network 1864 through a network interface or adapter 1868. When used in a WAN networking environment, the computer 1802 typically includes a modem (e.g., telephone, DSL, cable, etc.) 1870, or is connected to a communications server on the LAN, or has other means for establishing communications over the WAN 1866, such as the Internet. The modem 1870, which can be internal or external relative to the computer 1802, is connected to the system bus 1808 via the serial port interface 1844. In a networked environment, program modules (including application programs 1834) and/or program data 1838 can be stored in the remote memory storage device 1862. It will be appreciated that the network connections shown are exemplary and other means (e.g., wired or wireless) of establishing a communications link between the computers 1802 and 1860 can be used when carrying out an aspect of the present invention.

In accordance with the practices of persons skilled in the art of computer programming, the present invention has been described with reference to acts and symbolic representations of operations that are performed by a computer, such as the computer 1802 or remote computer 1860, unless otherwise indicated. Such acts and operations are sometimes referred to as being computer-executed. It will be appreciated that the acts and symbolically represented operations include the manipulation by the processing unit 1804 of electrical signals representing data bits which causes a resulting transformation or reduction of the electrical signal representation, and the maintenance of data bits at memory locations in the memory system (including the system memory 1806, hard drive 1816, floppy disks 1820, CD-ROM 1824, and remote memory 1862) to thereby reconfigure or otherwise alter the computer system's operation, as well as other processing of signals. The memory locations where such data bits are maintained are physical locations that have particular electrical, magnetic, or optical properties corresponding to the data bits.

Figure 19:
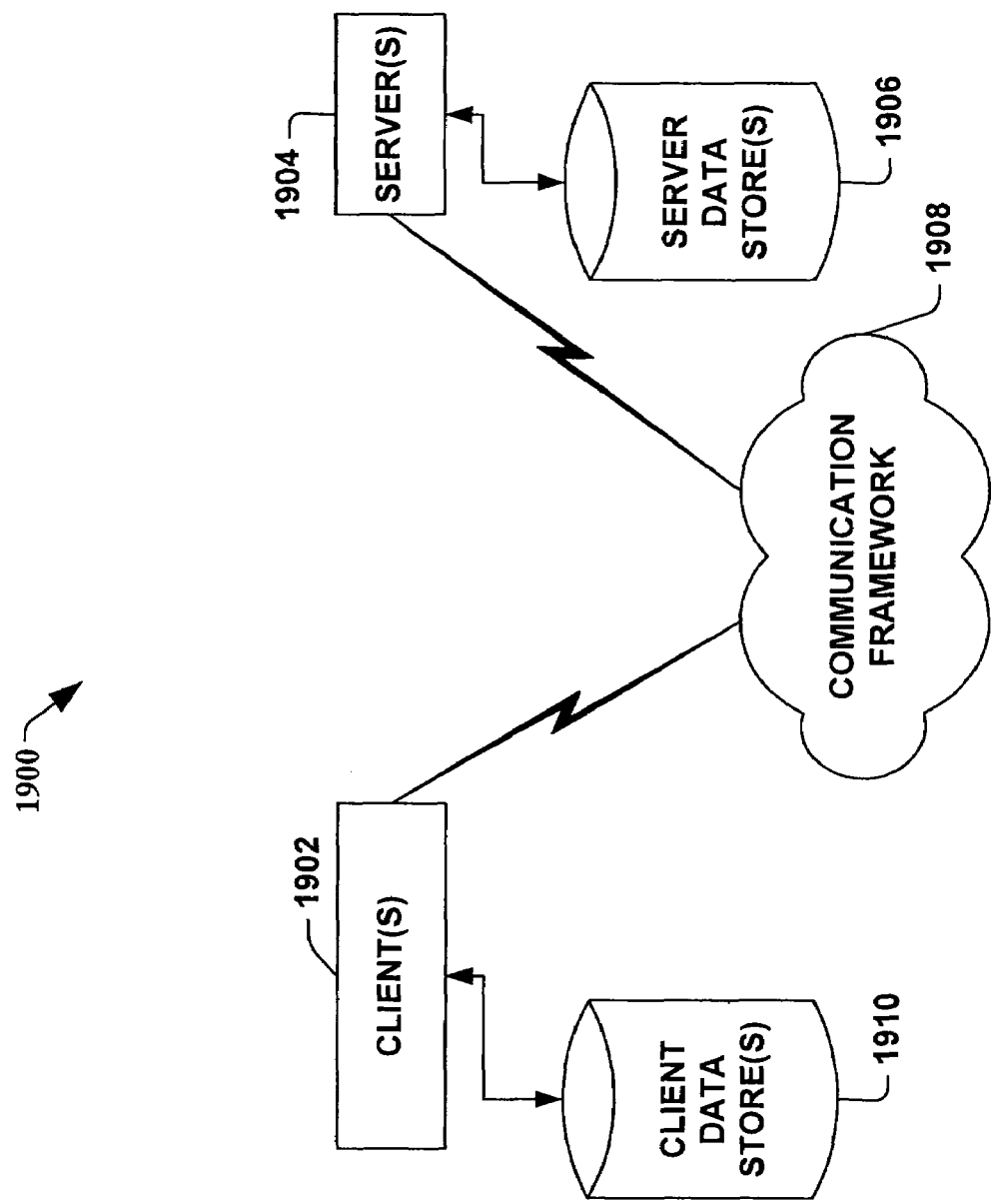
FIG. 19 illustrates another example operating environment in which the present invention can function.

FIG. 19 is another block diagram of a sample computing environment 1900 with which the present invention can interact. The system 1900 further illustrates a system that includes one or more client(s) 1902. The client(s) 1902 can be hardware and/or software (e.g., threads, processes, computing devices). The system 1900 also includes one or more server(s) 1904. The server(s) 1904 can also be hardware and/or software (e.g., threads, processes, computing devices). The servers 1904 can house threads to perform transformations by employing the present invention, for example. One possible communication between a client 1902 and a server 1904 may be in the form of a data packet adapted to be transmitted between two or more computer processes. The system 1900 includes a communication framework 1908 that can be employed to facilitate communications between the client(s) 1902 and the server(s) 1904. The client(s) 1902 are operably connected to one or more client data store(s) 1910 that can be employed to store information local to the client(s) 1902. Similarly, the server(s) 1904 are operably connected to one or more server data store(s) 1906 that can be employed to store information local to the servers 1904.

Figure 20:
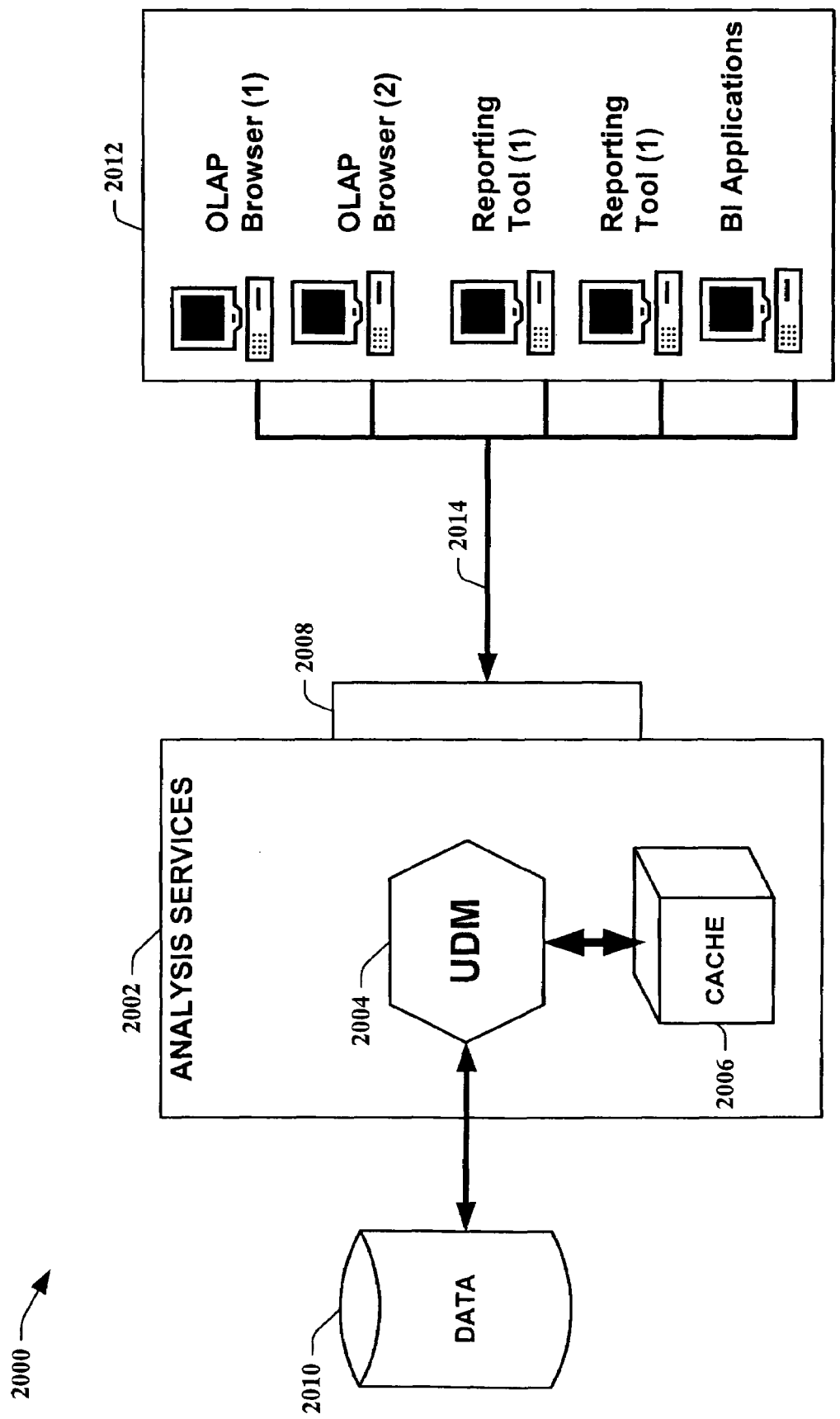
FIG. 20 illustrates yet another example operating environment in which the present invention can function.

Turning to FIG. 20, an example operating environment 2000 in which the present invention can function is shown. This typical environment 2000 comprises an analysis services component 2002 linked to a data source 2010 and user interfaces 2012. The user interfaces 2012 are comprised of OLAP browsers, reporting tools, and other BI (Business Intelligence) applications and the like. The analysis services component 2002 typically has an interface 2014 with the user interfaces 2012 via interfaces 2008 like XML/A (extensible Markup Language/Analysis) and MDX (Multidimensional Exchange Language) and the like. The analysis services component 2002 is comprised of a UDM (Unified Dimensional Model) component 2004 and a cache 2006. In this example, the present invention is employed within the analysis services component 2002 via the UDM component 2004 and the cache 2006. The UDM component can proactively access the cache 2006 and/or the data directly.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for proactively caching data of a database utilizing online analytical processing (OLAP) variants, the method being performed by a processor of a computer system having a database, the method comprising:
    creating a relational OLAP (ROLAP) object that represents data of the database;
    building a multidimensional OLAP (MOLAP) cache equivalent of the ROLAP object such that the MOLAP cache stores the same data of the database that is represented by the ROLAP object, the MOLAP cache and ROLAP object being stored on the computer system;
    receiving a first query, at the computer system, for a portion of the data;
    accessing the MOLAP cache to resolve the first query;
    receiving an indication, at the computer system, that the data of the database represented by the ROLAP object has been updated;
    rebuilding the MOLAP cache such that the MOLAP cache contains the updated data;
    receiving a second query, at the computer system, for a portion of the data while the MOLAP cache is being rebuilt;
    accessing the ROLAP object to resolve the second query while the MOLAP cache is being rebuilt;
    receiving a third query, at the computer system, for a portion of the data after the MOLAP cache is rebuilt; and
    accessing the MOLAP cache to resolve the third query.

2. The method of claim 1, wherein the MOLAP cache is built and rebuilt using a background process.

3. The method of claim 1, further comprising:
    receiving an indication while the MOLAP cache is being rebuilt that the data of the database has been updated; and
    restarting the rebuild of the MOLAP cache to account for the update to the data.

4. The method of claim 1, wherein rebuilding of the MOLAP cache is started after a specified amount of time after the update to the data occurs.

5. The method of claim 1, further comprising:
    receiving user input that specifies that the MOLAP cache should be rebuilt; and
    rebuilding the MOLAP cache in response to the user input.

6. The method of claim 1, further comprising:
    rebuilding the MOLAP cache after a specified amount of time even when the data of the database has not been updated.

7. A computer storage medium storing computer executable instructions which when executed by a processor of a computer system proactively cache data of a database utilizing online analytical processing (OLAP) variants, the computer executable instructions performing the following:
    creating a relational OLAP (ROLAP) object that represents data of the database;
    building a multidimensional OLAP (MOLAP) cache equivalent of the ROLAP object such that the MOLAP cache stores the same data of the database that is represented by the ROLAP object, the MOLAP cache and ROLAP object being stored on the computer system;
    receiving a first query, at the computer system, for a portion of the data;
    accessing the MOLAP cache to resolve the first query;
    receiving an indication, at the computer system, that the data of the database represented by the ROLAP object has been updated;
    rebuilding the MOLAP cache such that the MOLAP cache contains the updated data;
    receiving a second query, at the computer system, for a portion of the data while the MOLAP cache is being rebuilt;
    accessing the ROLAP object to resolve the second query while the MOLAP cache is being rebuilt;
    receiving a third query, at the computer system, for a portion of the data after the MOLAP cache is rebuilt; and
    accessing the MOLAP cache to resolve the third query.

8. The computer storage medium of claim 7, wherein the MOLAP cache is built and rebuilt using a background process.

9. The computer storage medium of claim 7, wherein the computer executable instructions further perform:
    receiving an indication while the MOLAP cache is being rebuilt that the data of the database has been updated; and
    restarting the rebuild of the MOLAP cache to account for the update to the data.

10. The computer storage medium of claim 7, wherein rebuilding of the MOLAP cache is started after a specified amount of time after the update to the data occurs.

11. The computer storage medium of claim 7, wherein the computer executable instructions further perform:
    receiving user input that specifies that the MOLAP cache should be rebuilt; and
    rebuilding the MOLAP cache in response to the user input.

12. The computer storage medium of claim 7, wherein the computer executable instructions further perform:
    rebuilding the MOLAP cache after a specified amount of time even when the data of the database has not been updated.

* * * * *